US007020147B1

(12) United States Patent
Amadon et al.

(10) Patent No.: US 7,020,147 B1
(45) Date of Patent: Mar. 28, 2006

(54) NETWORK TRAFFIC DIRECTOR SYSTEM HAVING MODULES THAT IMPLEMENT MERIT OR PENALTY FUNCTIONS INVOLVING STOCHASTIC CHANGES IN NETWORK TOPOLOGY

(75) Inventors: Gregory Amadon, Seattle, WA (US); Henry Adam Sowizral, Bellevue, WA (US); Karel Zikan, Seattle, WA (US)

(73) Assignee: Terabeam Corporation, Falls Church, VA (US)

( * ) Notice: Subject to any disclaimer, the term of this patent is extended or adjusted under 35 U.S.C. 154(b) by 936 days.

(21) Appl. No.: 10/001,427

(22) Filed: Nov. 13, 2001

(51) Int. Cl.
*H04L 12/28* (2006.01)

(52) U.S. Cl. ................... 370/401; 370/338; 343/712

(58) Field of Classification Search ............... 370/328, 370/338, 401
See application file for complete search history.

(56) References Cited

U.S. PATENT DOCUMENTS

| 2,522,189 | A | * | 9/1950 | Morrow | 174/48 |
| 3,683,379 | A | * | 8/1972 | Saddler et al. | 342/71 |
| 5,446,470 | A | * | 8/1995 | Avignon et al. | 343/713 |
| 5,530,963 | A | * | 6/1996 | Moore et al. | 709/243 |
| 5,786,923 | A | | 7/1998 | Doucet et al. | |
| 5,963,172 | A | * | 10/1999 | Pfizenmaier et al. | 343/721 |
| 6,310,881 | B1 | * | 10/2001 | Zikan et al. | 370/401 |
| 2003/0043824 | A1 | * | 3/2003 | Remboski et al. | 370/401 |
| 2003/0048766 | A1 | * | 3/2003 | D'Annunzio et al. | 370/338 |

* cited by examiner

*Primary Examiner*—Hanh Nguyen
*Assistant Examiner*—Brian Roberts
(74) *Attorney, Agent, or Firm*—Blakely Sokoloff Taylor & Zafman LLP

(57) ABSTRACT

A spontaneous data communication network includes antenna/transceiver sets located in mobile (e.g., vehicles such as cars, buses, trucks, ferries, etc.) or stationary units (e.g., computers, manufacturing equipment, office furniture, office equipment, road signs, overpasses, bridges, etc.). Each antenna/transceiver set directs network traffic based on optimizing a merit function or penalty function to reduce costs of congestion for stochastically changing demands and flows in a data communication system. The routers exchange values with neighboring routers. Based on the exchanged values and values local to a router, flow conditions are checked and if necessary the local values are adjusted until the flow conditions are satisfied or a time period expires. Adjustments are associated with optimizing a merit function or penalty function. Based on the adjusted values, the router adjusts parameters to be used to direct packets of the network traffic flows to other routers or other destinations within the data communication system. An aggregation scheme is used for reducing the number of values stored in a single router module.

20 Claims, 11 Drawing Sheets

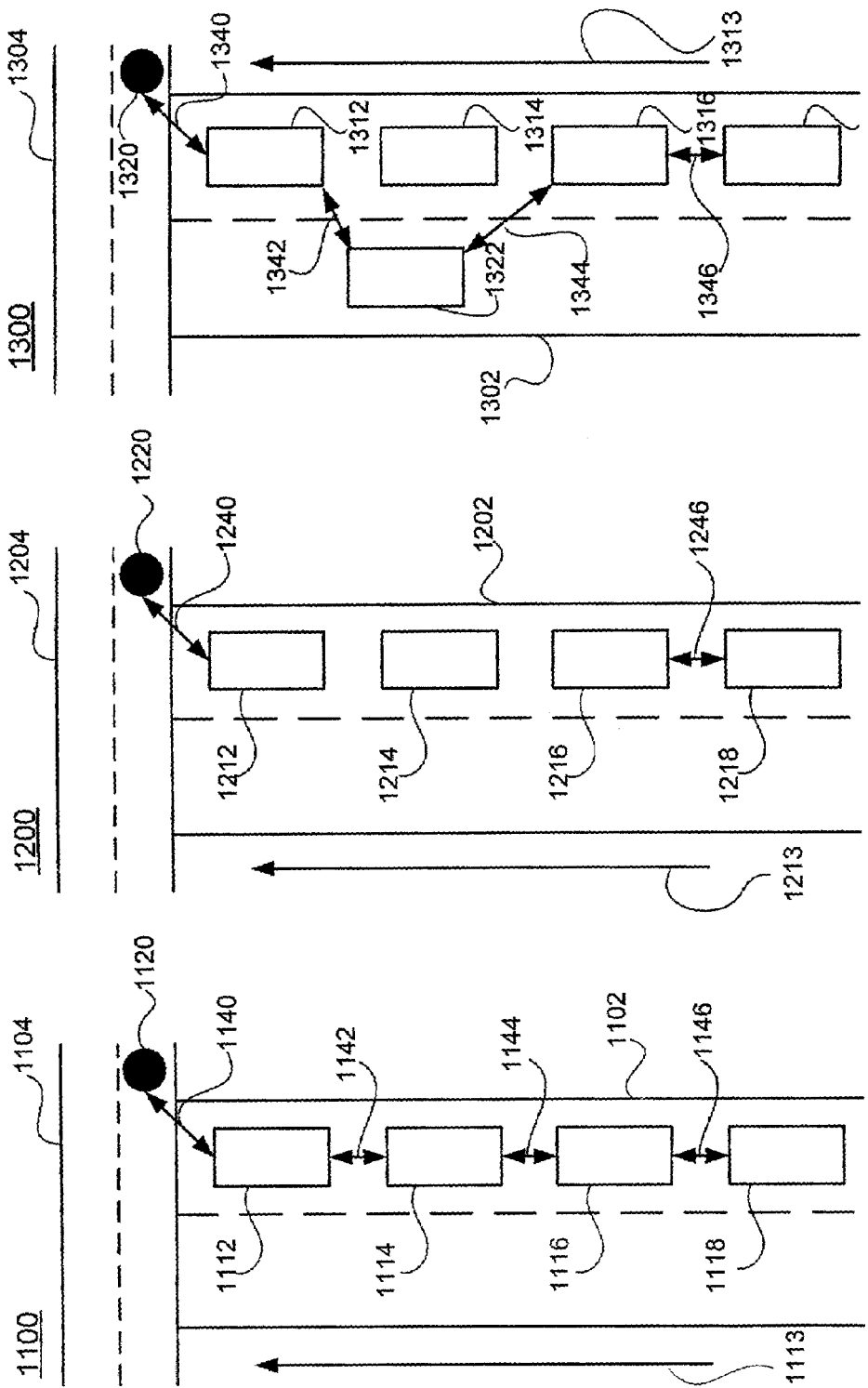

NETWORK TRAFFIC DIRECTOR SYSTEM HAVING MODULES THAT IMPLEMENT MERIT OR PENALTY FUNCTIONS INVOLVING STOCHASTIC CHANGES IN NETWORK TOPOLOGY

RELATED APPLICATIONS

The present application is related to U.S. patent application Ser. No. 09/176,061, filed Oct. 20, 1998, titled "Method and Apparatus for Network Control".

BACKGROUND OF THE INVENTION

1. Field of the Invention

The present invention is related generally to data communication systems and, in particular, to network control of data communication systems.

2. Background Information

Data communication systems generally consist of multiple networks that are linked together with bridges, switches, routers, or other devices. These linking devices direct data packets along various paths from an origination to a destination. Since a data communication system tends to be large with many networks and interconnecting links, typically a data packet can take many paths from its origination to its destination. A goal of a network traffic director system is to direct the journey of each data packet from its origination to its destination so that the capacity of the network is efficiently utilized.

Traditional network traffic director systems utilize a plurality of network routers based on Internet Protocol (IP). The IP routing approaches are based on a Shortest Path (SP) method in which packets are sent to their destination along the shortest paths in the network. There are various methods to determine shortest paths among the IP routing approaches. However, these approaches all share a common assumption that if each packet travels along the shortest path, then the overall workload required for the routing will remain as small as possible.

The assumption of traditional routing systems would hold true if the overall performance of a routing system could be adequately measured solely on the basis of the total number of decisions that routers need to perform. However, other factors are involved in the overall performance of a routing system. One of these factors is the amount of congestion in a data communication system. Some theoretical proposals exist which attempt to address the congestion of network traffic director systems. These approaches, however, are impractical in providing adequate solutions to the congested problem. The end result of some of these approaches produces, on average, flows that are little different than the shortest path methods of IP routing taking congestion into account. Another theoretical approach to congestion is intended for environments having predefined aspects, such as loading and network topology. However, a data communication system is seldom sufficiently predictable for these predefined approaches.

Other theoretical approaches attempt to address an aspect of the stochastic (random) nature of flows in a data communication system by allowing for randomness in the arrival times of individual data packets into a linking device. These approaches, however, are still formulated in a deterministic manner by requiring that demand or load rates and flow rates in other parts of the communication system be known in advance of their actual occurrence.

These prior art deterministic approaches are not ideally suited for data communication system environments in which demands or loads and flows in other portions of the data communication system have stochastic distributions due to changing demands or loads of individual users or due to any multiplexing involved. This means that not only are the arrival times of individual packets random, but also the rates of the demands or loads and flows in other portions of the data communication system are random and not known before their actual occurrence.

An effective optimization method must not only minimize congestion in the data communication system but it must be robust enough to adapt to sudden changes in conditions of the data communication system such as packet arrival, loading on the system, and changes to the system topology, including but not limited to the insertion and removal of nodes, without predefined scenarios of when or how these changes will occur.

In data communication systems, loading changes quickly and dramatically due to such influences as changing demands or loads of individual users and multiplexing methods such as time division multiplexing (TDM) where time slots of system use are divided among individual users. With TDM, a data communication system constantly changes the particular users on the system at any given moment, thus loading changes rapidly. Network topology can also have rapid stochastic changes due to situations such as equipment failures or weather conditions.

Also, whereas the prior art systems and methods focus on a single indicator, such as shortest path or average delay, as a basis to optimize data flow, there are many additional factors. These include average queue length at various data communication system linking devices, variance or standard deviation in individual delays of data packets traveling from an origination to a destination, and average and variance of the individual utilized capacity of links and linking devices in a data communication system. Thus, a system and method is greatly desired which optimizes packet flow in a data communication system based on numerous factors while being robust enough to effectively adapt to unexpected events.

SUMMARY OF THE INVENTION

The present invention is directed to a network traffic director system in a data communication system having network traffic with randomly distributed demands and flows. In one aspect of the present invention the network traffic director system includes router modules configured to direct data packets in the data communication system, each router module being a home router module including a neighborhood supervisor. The neighborhood supervisor is configured to send home potentials of the home router module to neighborhood supervisors of neighboring router modules and to receive neighbor potentials of the neighboring router modules from neighborhood supervisors of neighboring router modules. The home router module further includes a dynamic load balancer configured to determine flows based on the home and neighbor potentials. The dynamic load balancer adjusts the home potentials if first conditions including flow conditions are not met. The dynamic load balancer also updates routing tables if second conditions based on the adjusted home potentials are met. The home router module also includes a dynamic data flow splitter configured to receive data packets from networks and router modules. The dynamic data flow splitter selects a portion of the data communication system for each data packet received based on the updated routing tables. Each received data packet is transmitted to the portion of the data communication systems selected by the dynamic data flow splitter for the received data packet.

Another aspect of the invention includes the home potentials of each home router module being associated with a pair of nodes of the data communication system including an origination node and a destination node. The home potentials of each router module are also associated with a quality of service level. The neighborhood supervisor is configured to send the home potentials to neighborhood supervisors of neighboring router modules when the flow conditions are not met. The flow conditions include conservation of flows. The dynamic load balancer is configured to determine flows by using a response function associated with optimizing at least one of a penalty function or a merit function for stochastic demands or flows of the data communication system. The dynamic data flow splitter is configured to select the portion of the data communication system for each packet received further based on either a Markov protocol, a Routing Wheel protocol, previously selected portions of the data communication when an address for a received data packet is a same type as an address stored in the dynamic data flow splitter, or on a quality of service level associated with a data packet.

In a further aspect of the invention the neighborhood potentials are stored according to an aggregation scheme. The merit or penalty functions are at least locally approximated by a quadratic function of the flows. The ideal data flows are further based on resistance of arcs associated with the router module wherein each resistance of an arc is configured to be a function or either arc capacity or a function of flows of the arc. The neighbor router modules are configured to be associated with the home director module through at lease one of a political, organizational, topological, topical, or geographical, relation. In a further aspect each router module is configured to adjust home potentials to an equilibrium point for a difference function associated with flows of arcs associated with the router module. The difference function is associated with differences between home potentials and neighbor potentials. The merit function or penalty function involves costs of congestion including at lease one of traffic delays, high latency, diminished throughput, lost packets or unresponsiveness to sudden changes in topology or loading.

BRIEF DESCRIPTION OF THE DRAWINGS

FIG. 11 is a high-level block diagram of an alternative example of a spontaneous network according to embodiments of the present invention.

FIG. 12 is a high-level block diagram of an alternative example of a spontaneous network according to embodiments of the present invention.

FIG. 13 is a high-level block diagram of an alternative example of a spontaneous network according to embodiments of the present invention.

DETAILED DESCRIPTION

In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Some parts of the description will be presented using terms such as agent, link, light beam, transceiver, photon, remote monitors, and so forth. These terms are commonly employed by those skilled in the art to convey the substance of their work to others skilled in the art.

Other parts of the description will be presented in terms of operations performed by a computer system, using terms such as receiving, detecting, collecting, transmitting, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented.

Reference throughout this specification to "one embodiment" or "an embodiment" means that a particular feature, structure, process, step, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
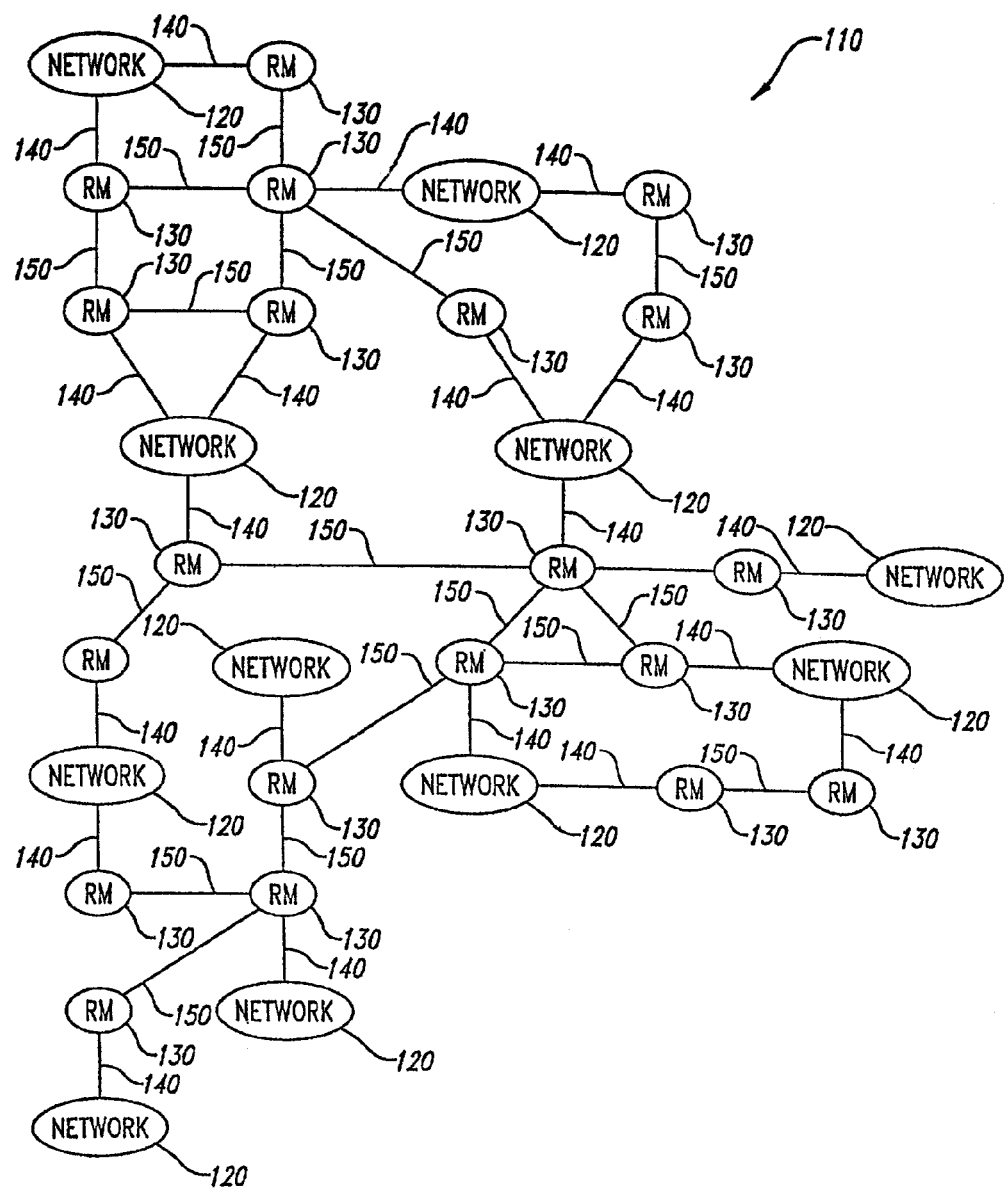
FIG. 1 is a topology diagram representative of a network traffic director system of the present invention.

Large communication data systems are comprised of a collection of networks linked together by linking devices, such as routers, bridges, and switches known herein as router modules or director modules. The depicted embodiment in FIG. 1 has a network traffic director system 110 in a data communication system which links a collection of networks 120 via router modules 130 and associated links 140 and links 150. A link 140 is a data communication path for data packets to travel between a network 120 and a router module 130. A link 150 is a data communication path for data packets to travel between two router modules 130. Network traffic is made up of individual data packets which are sent between the networks 120 via the router modules 130. The network traffic director system 110 as embodied in the router module 130 allows more efficient utilization of data communication systems over prior art linking devices. The router module 130 is configured to adapt to sudden changes in the data communication network, such as randomly and rapidly changing service demand or load rates or topology, while optimizing utilization of the data communication system based on numerous factors, including traffic delays, queue lengths, variance in individual delays, average and variance of utilized capacity of links and linking devices, number of lost packets, latencies, and throughput of linking devices.

Unlike prior art methods, for the depicted embodiment, the optimization methods used account for the numerous factors influencing utilization of a data communication system by formulating a penalty function (which accounts for negative effects, such as lost packets, increased delays, high latency, diminished throughput, among other things) or its opposite merit function (which accounts for beneficial effects). The merit and penalty functions are formulated for optimization and determination of equilibrium points given a rapidly changing, stochastic environment of random demands upon a data communication system, random flows through a data communication system and random changes in topology of a data communication system.

This stochastic approach is far different from prior art methods, which rely on predictable, non-stochastic environments and utilize deterministic formulations. The systems and methods used by the depicted embodiment of the network traffic director system 110 are designed to be effectively implemented in a data communication system without having extraordinary processing requirements, resource needs or other demands upon the overall data communication system. These and other advantages will become apparent in the following detailed description. In the following description, numerous specific details are provided such as methods and systems used to collect information from the router modules 130, to determine whether conditions are satisfied, and to adjust values related to the router modules 130 accordingly. One skilled in the relevant art, however, will recognize that the invention can be practiced without one or more of the specific details, or with other devices and methods. In other instances, well known structures or operations are not shown or described in detail to avoid obscuring the description of the embodiments.

Figure 2A:
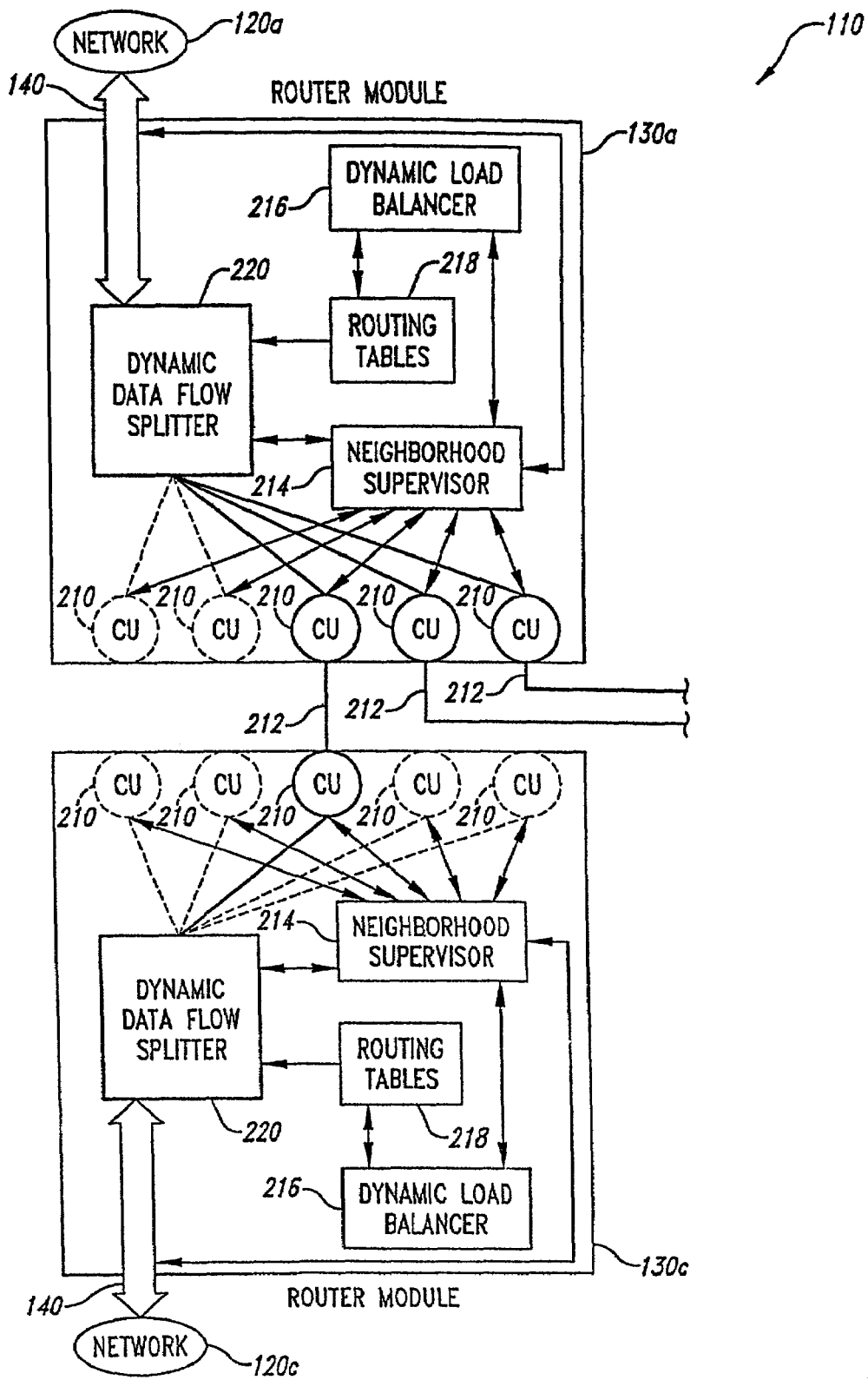
FIG. 2 is a block diagram showing interconnection detail or router modules of the network traffic director system of FIG. 1.
Figure 2B:
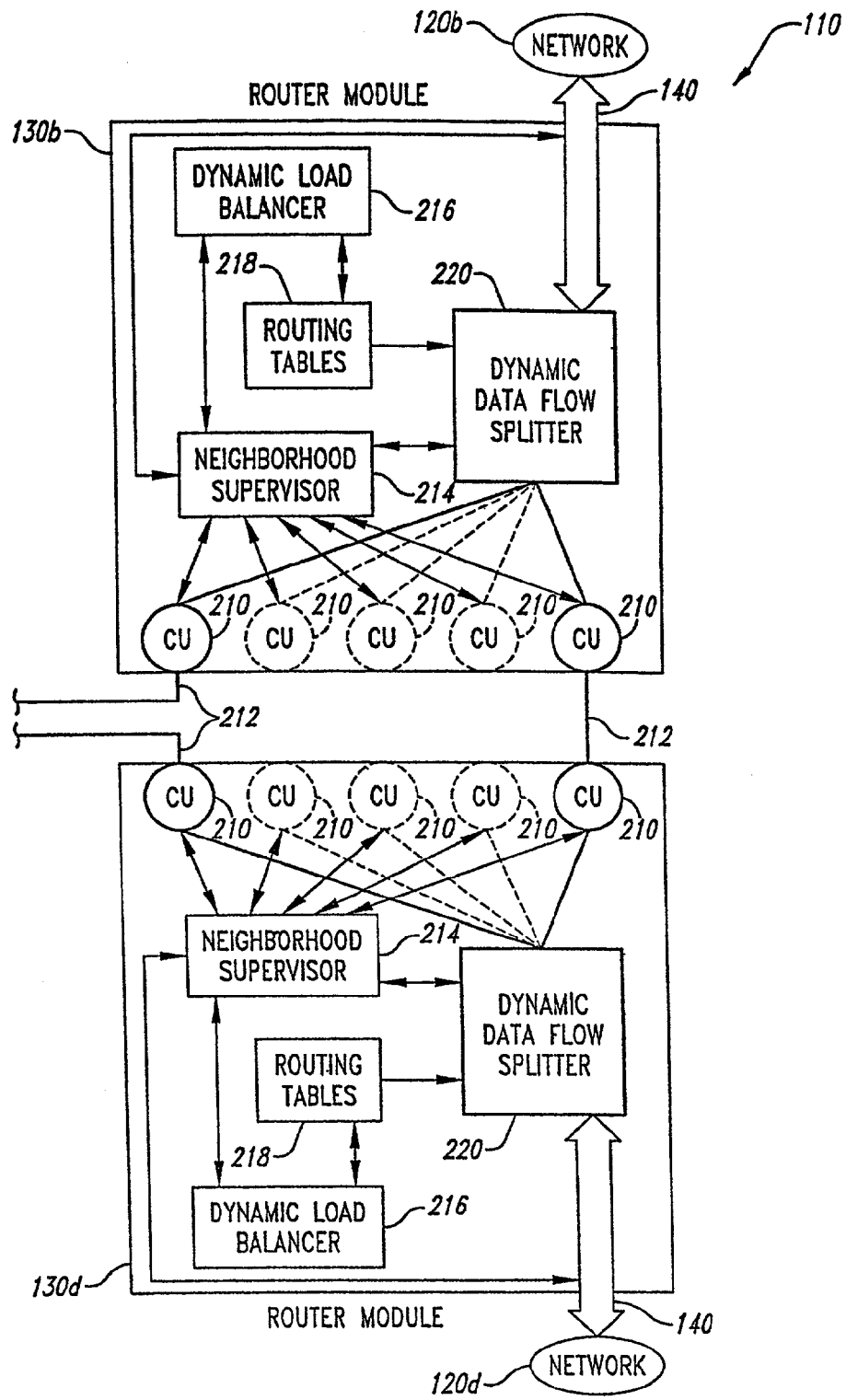

In order to connect the networks 120 of the data communication system together, the router modules 130 are connected together via communication units 210 as shown in FIG. 2. The communication units 210 are linked together by data communication pathways 212. The communication units 210 in one embodiment are Ethernet network cards and the data communication pathways 212 are Ethernet cables. Ethernet is a term well known in the art referring to collision sense multiple access/collision detection techniques as described under the IEEE 802 series specifications. In other embodiments of the present invention, the communication units 210 and pathways 212 are other types of point-to-point data communication links.

Some of the communication units 210 shown in FIG. 2 are not shown to be connected via any data communication pathway 212. These communication units 210 can be connected to other router modules 130 which are not shown in FIG. 2. The number of communication units 210 shown for each individual router module 130 is not intended to limit the depicted embodiment since some router modules have more communication units 210 than shown in FIG. 2 if necessary to link additional router modules.

Each router module 130*a–d* as shown in FIG. 2, is connected to a data network 120*a–d*. However, the number of data networks 120 connected to any one router module 130 varies, and some router modules 130 are only used to interconnect other router modules and are not directly connected to any network 120. In other instances, router modules 130 can be directly connected to a plurality of networks 120. Each router module 130 has a neighborhood supervisor unit 214 that includes a values exchanger, a dynamic load balancer unit 216, a routing table unit 218 with a plurality of routing tables, and a dynamic data flow splitter unit 220.

The neighborhood supervisor unit 214 of a home router module 130 exchanges information with router modules that are neighbors to the home router module. These neighboring router modules 130 are directly connected to the home router module. For instance, in FIG. 2 the neighbors of home router module 130*a* include router modules 130*b*, 130*c*, and 130*d* because they are directly connected to router module 130*a* via communication pathways 212 from one communication unit 210 of a neighboring router module 130*b–d* to a communication unit 210 of the home router module 130*a*.

The neighborhood supervisor unit 214 also monitors for malfunctions and link failures in the data communication system. Along with monitoring, the neighborhood supervisor unit 214 updates data in the dynamic load balancer 216 of the home router module 130 to be consistent with the current physical state of the data communication system. The neighborhood supervisor unit 214 also reports detected network failures to a central fault reporting device located in the data communication system through a central fault monitoring function.

The dynamic load balancer unit 216 uses information collected by the neighborhood supervisor unit 214 of the home router module 130 from the neighboring router modules 130. The dynamic load balancer unit 216 adjusts the routing tables of the routing table unit 218 based upon the information collected in order to optimize overall utilization of the data communication system served by the network traffic director system 110. The methods used by the dynamic load balancer unit 216 will be discussed further below. The routing table unit 218 provides information to the dynamic further below. The routing table unit 218 provides information to the dynamic data flow splitter unit 220 of the home router module 130 in order that the data packets receive by the communication unit 210 of the home router module 130 are directed to destination networks 120 of router modules 130 in a manner that preserves the integrity of the mathematical models used by the dynamic load balancer unit 216.

The dynamic data flow splitter unit 220 performs the actual routing operation of data packets received by the home router module 130 to direct the received data packets to other networks 120 or router modules. The division of labor between the routing table unit 218 and the dynamic flow splitter unit 220 can be varied. In one embodiment, the routing table unit 218 prepares the routing data in a suitable form for the dynamic data flow splitter unit 220. The routing table unit 218 then stores this routing data until the dynamic data flow splitter unit 220 requires the data. The dynamic data flow splitter unit 220 then looks up the routing data in the routing table unit 218 to determine how a particular data packet is to be routed. The dynamic data flow splitter unit 220 in various embodiments of the present invention use different methods to determine how a received data packet should be routed. Depending on which method is used, a received data packet will be sent by either the communication unit 210 or the dynamic data flow splitter 220 of the router module 130 to different router modules 130 through one of the communication units 210 or to a directly linked network 120. Four different methods of determination, also called splitting protocols, are typically chosen.

Markovian splitting is the simplest of these routing protocols to implement in software. In the Markovian protocol, the routing table unit 218 transforms the desired flows into equivalent routing fractions. Only the flows out of the router module 130 are relevant. For each destination, if $f_i$ is the desired flow to the neighbor i for all the neighbors j of the router module 130, then the fraction of the flow to this is $p_i = f_i / \Sigma_j f_j$. In turn, the dynamic data flow splitter unit 220 views the fraction as a probability of a Markov process. When routing a data packet, the dynamic data flow splitter unit 220 looks up the probabilities corresponding to the packet destination, $p_1, p_2, \ldots, p_k$. The flow splitter then "casts a random die," with an associated probability $p_i$ of the outcome i, and sends the data packet to the lucky winner.

The easiest way to cast the random die is to generate a uniformly random number between zero and one and determine where this number falls in the cumulative probability sequence $\{P_i\}$ given by $P_0 = 0$, $P_i = P_{i-1} + p_i$. The random numbers can be generated "on the fly" or they can be stored a priori.

The second routing protocol, called a "Routing Wheel," reduces the randomness of the Markovian protocol and is easy to implement in hardware. Given the desired probabilities $p_1, p_2, \ldots p_k$, for flows to 1 through K neighboring router modules generates N (e.g., 100) labels. The labels identify individual router modules 130 and are assigned among the neighboring router modules 130 according to the probability associated with each neighboring router module. For instance, the neighboring router module 130 "i" having probability $p_1$ is assigned $Np_i$ number of labels identifying that particular neighboring router module. The routing table unit 218 then arranges the labels into a conceptual distribution resembling a physical circle where all label types are distributed fairly evenly around the conceptual circle. The routing table unit 218 then sets a conceptual pointer to a location on the circle. When the dynamic data flow splitter unit 218 services a data packet, it looks up the currently selected label on the circle. The dynamic data flow splitter unit 220 then sends the packet to the neighboring router module 130 indicated by the current label and then advances the pointer to the next label on the circle. The process never runs out of labels since when the pointer is at the label in position N, the pointer next advances to the label in position 1. In further embodiments, a routing wheel is generated for each origination/destination pair and quality of service level combination (OD/QoS). OD/QoS combinations are discussed in detail below.

Some higher level IP protocols are designed in such a way that makes the arrival of the data packets in an orderly sequential fashion at the final destination desirable. These protocols can handle fallouts and out-of-sequence arrivals, but they become increasingly inefficient as the number of out-of-sequence arrivals grows. In order to increase the efficiency of such transfer protocols, the following modification of flow splitting is used. This modification is incorporated into the third routing protocol and works with either Markovian splitting or Routing Wheel splitting.

For the third routing protocol, the granularity of splitting is changed for the applications running the higher level protocols mentioned above. Such protocols can usually be recognized from a device number in a packet header. The dynamic flow splitter unit 220 is endowed with short-term memory. When one of the "suspect" device numbers appears in the header of a packet, the dynamic flow splitter unit 220 remembers the origin, the destination, the device number of this packet, as well as the label of the neighboring router module 130 to which the packet was sent. All subsequent packets that have the same origin, destination, and device number that arrive while the memory persists are then sent to the same neighboring router module 130 as the original packet. In alternative embodiments, the short-term memory is optionally refreshed by the later arrivals.

The fourth routing protocol used with the dynamic data flow splitter unit 220 relates to low latency and quality of service. Latency of a system is the time required to send and receive information. Some applications, such as telephony, video-telephony, or real-time interactive games or simulations require low latency levels. The latency requirements of other applications such as transmissions of email are not as stringent. The ordinary method for lowering latency for urgent data packets is to give these packets a routing priority while in routing queues as discussed below.

Achieving additional speedups of urgent data packets is realized by making the dynamic data flow splitter unit 220 send more of the urgent packets over faster links and paths. The dynamic data flow splitter unit 220 then compensates for this by sending more of the ordinary packets over slower links. The compensation can be adjusted to leave the overall performance of the routing system unchanged. In one embodiment, identification of the faster links by the network traffic director system 110 in the data communication system is readily accomplished because a high correlation exists between the highly used links and the faster links. This condition is used to satisfy latency and quality of service requirements by directing the urgent packets toward the most frequented path choices for a given address group and by directing more of the less urgent packets away from the most frequented path choices.

Figure 3:
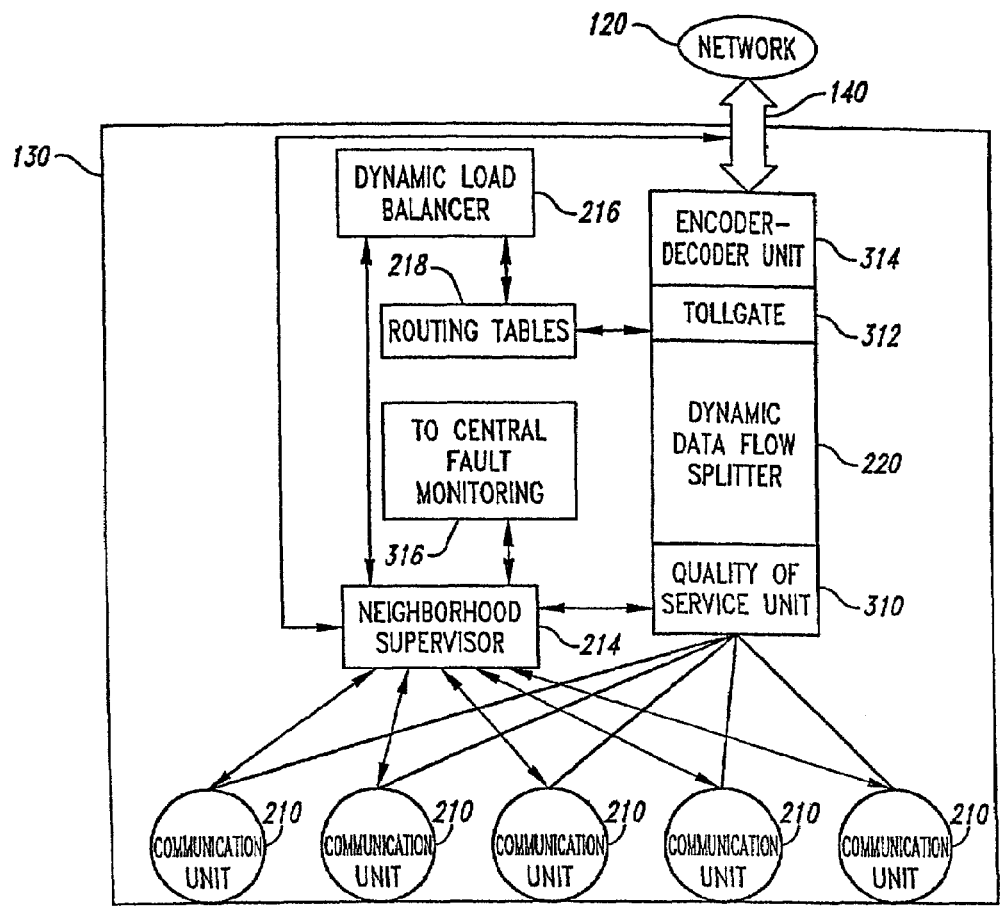
FIG. 3 is a block diagram showing internal detail of a router module of FIG. 2.

The router module 130 also has a quality of service unit 310, a toll gate unit 312, an encoder-decoder unit 314, and a central fault monitoring unit 316 as shown in FIG. 3. The quality of service unit 310 is concerned primarily with latency regarding transmission of data packets in the data communication system. The quality of service unit 310 is used to establish separate queues for applications with different latency and bandwidth needs. The queues are then served by appropriate frequencies of service and processing rates. Also, billing rates are dependent upon the level of quality of service. The toll gate unit 312 collects the billing statistics used to bill customers of the data communication system. These statistics primarily focus on billing. However, they can be used to determine bandwidth demands and optimize routing network topology.

To ensure privacy of communication, the data packets sent across network links that are vulnerable to eavesdropping are encoded for transmission and decoded at the destination router module. The encoder-decoder unit 314 performs the encoding and decoding operations. This link security is not directly related to the routing operations of the router module 130. Sufficient bandwidth for the encoder-decoder unit 314 is required so that transmission speed of the overall router module 130 is not impeded.

As described above, the dynamic load balancer unit 216 uses information from the neighborhood supervisor unit 214 to determine parameters that the routing table unit 218 then uses to prepare routing table data. A goal of the dynamic load balancer unit 216 is to optimize traffic flows in the data communication system of which the network traffic director system 110 is part. A method used by the dynamic load balancer 216 of the depicted embodiment used to accomplish this goal is described as follows.

As discussed above, each link 140 between one router module 130 and one network 120 and each link 150 between two router modules 130 is a data communication path that allows for two-way traffic of data packets. Thus, each of links 140 and 150 of FIG. 1 allows data packet traffic to travel in two directions either to or from a particular network 120 or router module 130.

To assist in describing the systems and methods below, each direction that a packet can travel along a link 140 or 150 is referred to as an "arc." The term "arc" does not refer to any particular physical part of a link 140 or 150 because the links allow packets to travel in either one of two directions. Rather, the term "arc" is conceptual since it refers to only one direction of travel in a link 140 or 150. Since links 140 and 150 each allow for two directions that packets can travel, each link 140 and 150 is assigned two conceptual arcs, one arc for each of the two directions of travel allowed for within each link. Thus, each line of FIG. 1 which represents a link 140 or 150 could be replaced by two lines representing two arcs which conceptually indicate the two directions of travel that are possible for packets to take on the link. The arcs of links 140 and 150 are illustrated in FIG. 4 where each link has two arrows representing arcs for the two directions that packets can travel for any one link.

The depicted embodiment is not limited to links between networks 120 and router modules 130 but could include links between other network devices or networks of any size and topology. For example, links between routers and individual computers or terminals and links between large networks such as the work-wide Internet and a country sized corporate networks and small office local area networks are included in the depicted embodiment.

Figure 4:
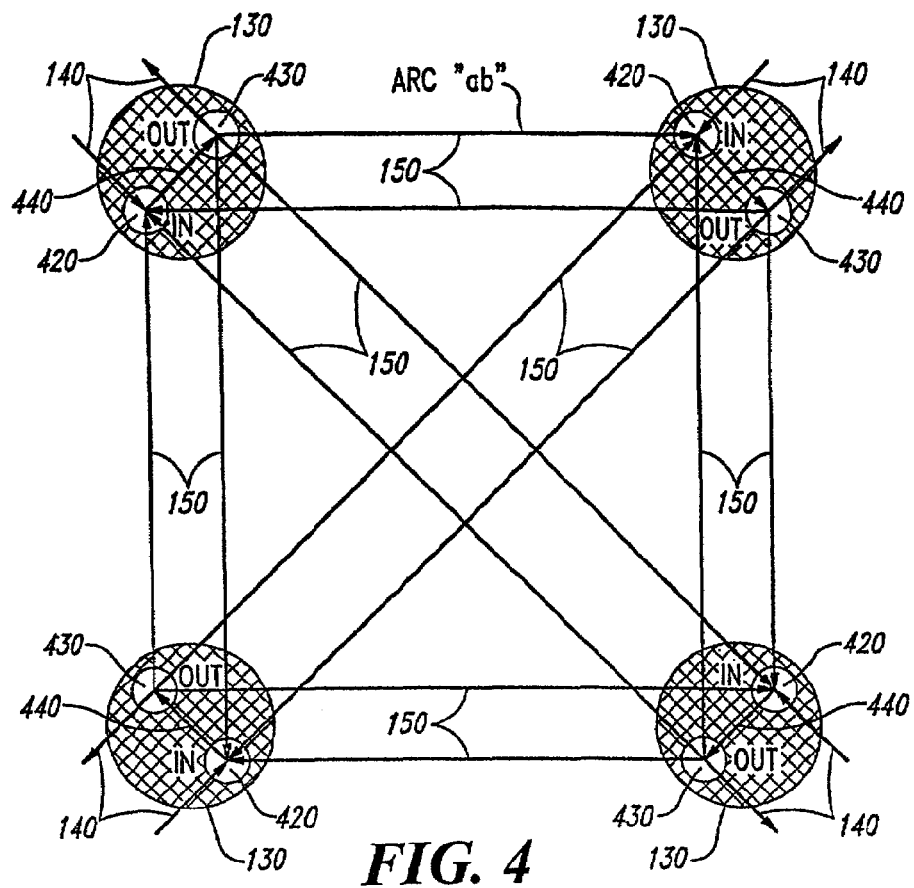
FIG. 4 is a topology diagram showing internal detail of a router module of FIG. 2.

Within router modules 130 there is an In node 420 and an Out node 430 as shown in FIG. 4. Flow of the internal arcs 440 originate from the In nodes 420 and terminate at the Out nodes 430 of each router module 130. The internal arcs 440 allow for additional parameters to be used in optimizing the data communication system. To furnish additional parameters, each In node 420 and Out node 430 is treated similarly as how the router modules 130 are treated in the various formulations for the depicted embodiments discussed below.

For typical flow conditions in a data communication system, an overall flow in a particular arc typically is a conglomeration of one or more separate flows. Each separate flow is characterized by its particular combination of flow origination and flow destination expressed as its origination/destination (OD) pair. The origination and destination are typically expressed at the network 120 or router module 130 level, so it is typically not expressed at a level specifying particular devices attached to a network. In some embodiments, the separate flows for a particular arc have unique OD pairs. Summing over these unique OD pairs gives the overall flow $f_{arc}$ for these arcs.

In the depicted embodiment, the separate flows are also characterized by different quality of service (QoS) levels. In this embodiment, at least occasionally, a particular arc will have more than one separate flow having the same OD pair, but having different QoS levels. To determine the overall flow farc for these types of arcs, the separate flows would be summed over both the OD pairs and QoS levels, giving unique OD/QoS combinations. Characterization of the separate flows of an arc is not limited in the present invention to only OD/QoS combinations, but also incorporates other factors associated with traffic flow in a data communication system. For instance, in another embodiment, characterization of separate flows in an arc includes a device number of an origination or destination device attached to a network 120.

The overall flow of an arc is also constrained by an upper bound and a lower bound. The upper bound is typically proportional to the processing capacity of the arc for the depicted embodiment (e.g., 0.7 or 0.8 of the processing capacity of the arc). Each individual flow can be constrained by its individual upper bound and individual lower bound. Again, the most common lower bound is zero for the depicted embodiment.

The method to optimize traffic flow used by the dynamic load balancer unit 216 of the depicted embodiment defines an ideal theoretical state for data packet traffic in the data communication system as the case where there is zero flow throughout the data communication system while all demands or loads by users upon the data communication system are satisfied. A solution for data flows in the data communication system is sought where the solution is a point in a solution space that has minimum distance to the theoretical ideal state. The solution is subject to certain physical constraints of a data communication system and is found through convex duality theory or convex optimization theory.

In the depicted embodiment, the solution for data flows in a data communication system is uniquely formulated to optimize a variety of network objectives and conditions compared with prior art formulations that focus on one known data rate objective or condition subject to conversation of data flows. Data flows are conserved when the amount of flow leaving the node. Any data either produced or destroyed at a node is factored into data flow conservation.

The solution for data flows also optimizes the following uniquely formulated expression $E\alpha,\beta$ (f) involving a substantially quadratic function of data flows in a data communication system:

$$E\alpha, \beta(f) = \alpha \sum_j \sum_{ab} \left[ (r_{j,ab}/2) * (g_{j,ab} - f_{j,ab})^2 \beta \sum_{ab} \left[ (r_{ab}/2) * \left(g_{ab} - \sum_j f_{j,ab}\right)^2 \right] \right]$$

where the subscript "j" indicates a particular OD/QoS combination and the subscript "ab" indicates a particular arc "ab". The term fj,ab is for flow associated with a particular OD/QoS combination "j" and a particular arc "ab". The terms rj,ab and gj,ab are resistance and goal parameters, respectively, for the particular OD/QoS combination "j" and arc "ab". The multiplication factors α and β are important, we implicitly assume the quantities are scaled to satisfy α+β=1.

In the form above, the expression $E\alpha,\beta$ (f) is a penalty function which represents undesirable influences and results affecting communication flow in a data communication system as have been described. Optimization of the expression $E\alpha,\beta$ (f) as a penalty function would result in minimization of $E\alpha,\beta$ (f). If the expression $E\alpha,\beta$ (f) was negated it would take on the form of the merit function. Optimization of a merit function would result in a maximization of the merit function. Other formulations that are equivalent to optimization of the penalty and merit functions involve determining a point of equilibrium. As known in the art, once an optimization formulation is described, an equivalent formulation for a point of equilibrium is determined by using mathematical techniques known in the art.

In preferred embodiment, $rj,ab=rab=1/cab$; $gj,ab=gab=0$; and $\alpha$ and $\beta$ are of the same magnitude. Then the solution of the optimization problem is the same as the solution of the competitive equilibrium problem using only the latter part of the equation, that is $$E\alpha,\beta(f) = \sum_{ab} [(1/2)_{C_{ab}}) * \left(\sum_{j} f_{j,ab}\right)^2]$$

Over the non-supply/demand arcs.

Other embodiments also include minimization of other penalty functions and maximization of other merit functions. Such penalty and merit function are related to the depicted embodiment in that portions of these other penalty and merit functions are at lease locally approximated by the expression $E\alpha,\beta$ (f) above. These penalty and merit functions all are advancements compared with the prior art, since the are used to optimize flows in a stochastic environment of data communication system.

The expression $E\alpha,\beta$ (f) incorporates factors associated with individual OD/QoS combinations for each arc "ab" over all the arcs in a data communication system. Each individual OD/QoS combination "j". Thus, $rj,ab \propto 1/Cj,ab$ for all j. In component flows, most commonly $$g_{ab} = \sum_{j} g_{j,ab}.$$

The resistance parameter is also used to designate that an arc for an OD/QoS combination is not functional by setting $r_{j,ab}$ to a relatively large number. The solution to the optimization of the uniquely formulated expression $E_{\alpha,\beta}(f)$ over all the component flows $f_{j,ab}$ of each OD/QoS combination "j" for each arc "ab" over all arcs and OD/QoS combinations of a data communication system results in solutions of flow flab for each OD/QoS combination "j" for each arc "ab" in the data communication system.

Methods that could be used to solve the optimization of the uniquely formulated expression $E_{\alpha,\beta}(f)$ include methods that have been used to solve other optimization formulations such as a projected gradient method, and a hill climbing method. The depicted embodiment uses a unique distributed optimization method incorporated in the dynamic load balancer unit 216 for optimizing the expression $E_{\alpha,\beta}(f)$. This method is uniquely formulated for stochastic network flow that is uncertain, rapidly changing and random and topology that can stochastically change. The distributed optimization method is generally easier to implement and converges more quickly to a solution compared with prior art methods that have been used on other formulations. The distributed optimization method also incorporates conservation of flows and unique formulations of $g_{j,ab}$ and $r_{j,ab}$.

As part of this distributed optimization method, the depicted embodiment defines a set of quantities at each router module 130 that are related to flows. Each quantity is referred to as a "potential." The set of potentials for a particular router module 130 has one potential for each possible OD/QoS combination known to the particular router module 130. Possible OD pairs are determined by the various combinations would not typically include combinations where both the origination and destination are the same. Typically, the data packet origination and destinations would be networks 120 and router modules 130, but could include other network devices at a more discrete level as discussed above, such as individual computers or terminals. Thus, the possible OD pairs of the OD/QoS combinations for a particular router module 130 would typically include the OD pairs derived from all data packet originations and data packet destinations known to the particular router module 130.

Typically networks 120 and router modules 130 are at times data packet originations and at other times data packet destinations. As such, the same two components of a first OD pair could be the components of a second OD pair by designating the first pair origination as the second pair destination and the first pair destination as the second pair origination. For small sized data communication systems, a router module 130 stores one potential for each possible OD/QoS combination for the entire data communication system. For a larger sized data communication system, an aggregation scheme is used which reduces the number of potential stored by each router module 130.

Figure 5:
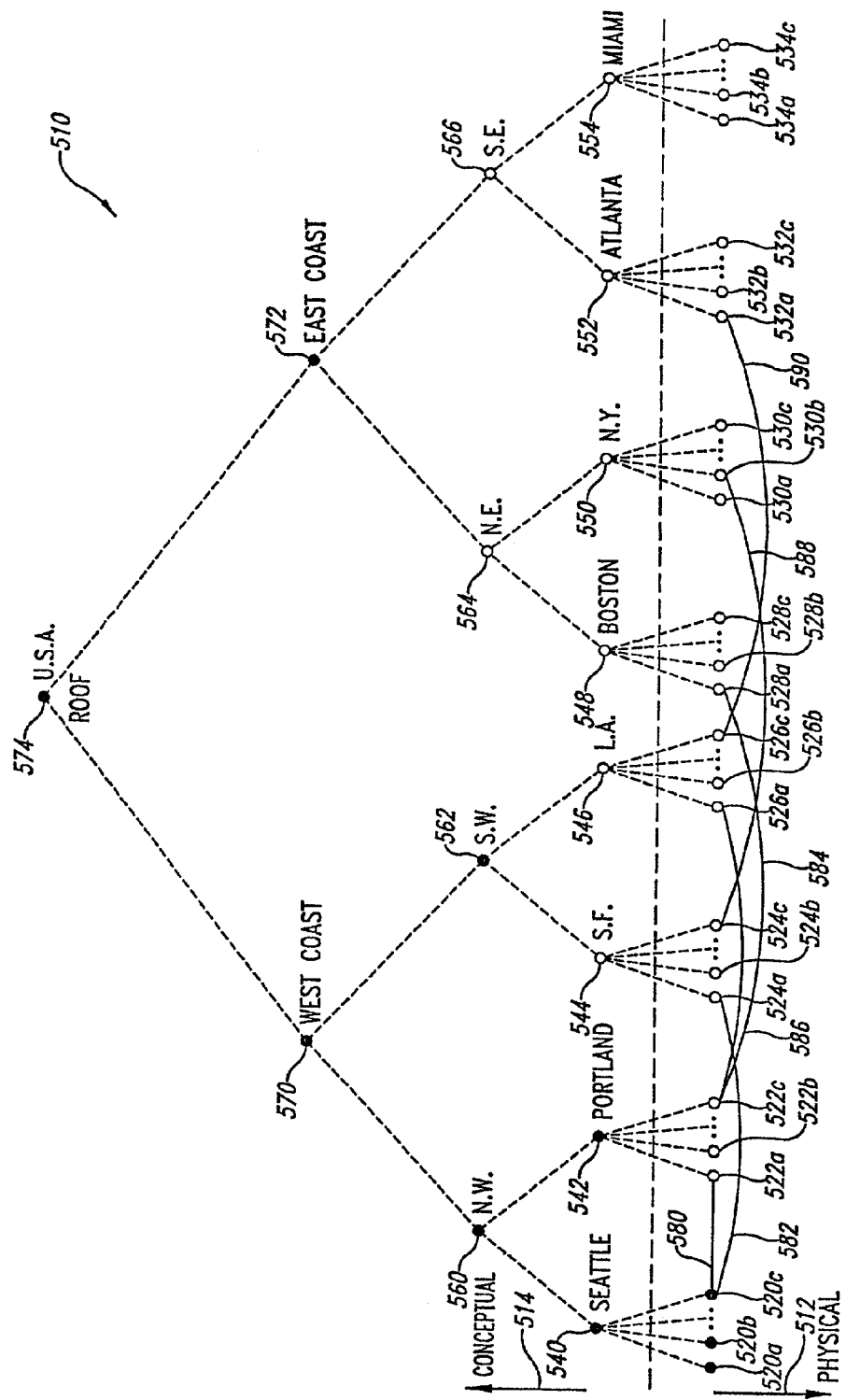
FIG. 5 is a relational diagram of an aggregation scheme used in the network traffic director system of FIG. 1.

An aggregation scheme reduces the number of networks 120 and router modules 130 known to any one router module 130 in order to keep the set of potentials stored in the router module to a manageable size. As shown in an aggregation hierarchy 510 of FIG. 5, this aggregation scheme has a physical portion 512 with physical nodes and a conceptual portion 514 with conceptual nodes. The physical nodes include networks 120 and router modules 130. The conceptual nodes each serve as labels for a particular collection made up of any number of physical nodes and/or other conceptual nodes. The physical nodes of the physical portion 512 are typically found in a particular geographical region. FIG. 5 only illustrates a representative example, and the depicted embodiment can have other regions of various sizes and locations.

Although FIG. 5 illustrates an aggregation hierarchy in terms of geography, the depicted embodiment is not limited to only hierarchies defined in geographical terms. Other hierarchies defined in terms of an organizational, political, topical, topological, or other types of structures are also included in the present invention. Also, FIG. 5 is not intended to limit the present invention to any particular manner or type of geography in defining the physical portion 512 of the aggregation hierarchy 510. The physical nodes can be grouped according to other common geographical regions besides the manner of using cities as regions as illustrated in FIG. 5.

For illustration purposes, FIG. 5 shows the regions of Seattle, Portland, San Francisco (S.F.), Los Angeles (L.A.), Boston, New York (N.W.), Atlanta, and Miami having physical nodes 520–534 respectively. The Seattle region and Portland region represented by conceptual nodes 540 and 542 are further aggregated into the Northwest (N.W.) region represented by conceptual node 560. Similarly, conceptual nodes 544 and 546 for the S.F. and L.A. regions respectively are further aggregated into the southwest (S.W.) region represented by conceptual node 566. The conceptual nodes 560 and 562 for the N.W. and S.W. regions respectively are aggregated into the West Coast region represented by conceptual node 570. The conceptual nodes 564 and 566 for the N.E. and S.E. regions respectively are aggregated into the East Coast region represented by conceptual node 572. The conceptual nodes 570 and 572 for the West Coast and East Coast regions respectively are aggregated into the USA region represented by the conceptual node 574.

Physical nodes of the various regions in the physical portion 512 are directly connected with other physical nodes (typically router modules 130) in other regions of the physical portion. For instance, a physical node 520c in the Seattle region is directly connected to a physical node 522a in the Portland region through link 580. The various regions are connected together via this type of direct connection between physical nodes in one region and other physical nodes (typically router modules 130) in another region. Not all physical nodes in one region need to be connected to another physical node in another region. This is because physical nodes within the same region are connected to one another either directly or through other physical nodes (typically router modules 130) in the same region. Subnetworks formed by the aggregation scheme need to maintain connectivity. Thus, between each pair of nodes in a subnetwork there must be a connection. In the aggregation scheme illustrated in FIG. 5, the physical nodes 520a–c in the area of Seattle all share a common conceptual node 540 in the conceptual portion 514 label Seattle. Each physical node 520a–c in the area of Seattle stores one potential for each possible OD/QoS combination based on the physical nodes 520 composed of networks 120 and router modules 130 in physical area 512 associated with the Seattle conceptual node 540. Also, under the same aggregation scheme, each physical node 520a–c in the Seattle area further stores one potential for each possible OD/QoS combination based also on the conceptual nodes that are blackened in on FIG. 5. The resultant OD/QoS combinations include any OD pairs. The conceptual nodes that are blackened in on FIG. 5 are Seattle conceptual node 540, Portland conceptual node 542, N.W. conceptual node 560, S.W. conceptual node 564, West Coast conceptual node 570, East Coast conceptual node 572, and USA conceptual node 574. As shown in FIG. 5, the physical node 520c is directly connected to physical node 522a via physical link 580 and physical node 524a via physical link 582. Due to these direct connections, physical node 520c also stores potentials for OD/QoS combinations that incorporate one or both of physical nodes 522a and 524a as either origination, destination or both origination and destination. Thus, physical node 520c stores more potentials due to more OD pairs than the other physical nodes 520. In an alternate embodiment only physical nodes in the same region as the node in question along with appropriate conceptual nodes are used for possible OD pair combinations. For instance in the alternative embodiment, physical node 520c only stores potentials for physical nodes 520a–c in physical portion 512 and the blackened conceptual nodes. In the alternative connected nodes such as physical nodes 522a and 524a.

There are general rules to designate which physical and conceptual nodes are used to derive OD pairs for the OD/QoS combinations for a particular physical node. First, a router module 130 (at physical node 520c in the example of FIG. 5) stores potentials for each OD/QoS combination having an OD pair based on the physical nodes (520b and 520c in the example of FIG. 5) with which the router module 130 shares a common conceptual node (540 in the example of FIG. 5). Second, if the router module (at physical node 520c in the example of FIG. 5) is directly connected to other physical nodes (522a and 524a in the example of FIG. 5), the other physical nodes are also used to derive other OD pairs for OD/QoS combinations for which potentials are stored in the router module (at physical node 520c). Finally, the router module (at physical node 520c) will store potentials for OD/QoS combinations for OD pairs that incorporate one or both of conceptual nodes that are either "lineal ancestors" of the router module (at physical node 520c) or "siblings" of the lineal ancestors. For example of FIG. 5, the conceptual nodes that are lineal ancestors of the physical nodes 520 (including router modules 130) are Seattle conceptual node 540, N.W. conceptual node 560, West Coast conceptual node 570 and USA conceptual node 574. The conceptual nodes in the example of FIG. 5 that are siblings of the lineal ancestors are Portland conceptual node 542 (sibling of Seattle conceptual node 540), S.W. conceptual node 562 (sibling of N.W. conceptual node 560), and East Coast conceptual node 572 (sibling of West Coast conceptual node 570).

The method for optimizing network flow in a data communication system used by the depicted embodiment of the dynamic load balancer unit 216 is further based on a difference function $d(f_{j,ab}, p_{j,ab})$. The difference function $d(f_{j,ab}, p_{j,ab})$ is evaluated for each arc "ab" for each OD/QoS combination 'j' for each router module 130 in the data communication system. When the difference function $d(f_{j,ab}, p_{j,ab})$ is evaluated for a particular router module 130, that router module is designated a home router module. The difference function $d(f_{j,ab}, p_{j,ab})$ is evaluated for each arc that either originates from or terminates with the home router module are designated neighboring router modules. The neighboring router modules share with the home router module 130 the arcs either originating or terminating with the home router module potentials. Potentials $p_{j,a}$ and $p_{j,b}$ are at the origination and destination router modules 130 respectively of arc ab for OD/QoS combinations "j". Thus, the home router module 130 and neighboring router modules 130 are either origination or destination router modules, depending upon the origination and destination of the particular arcs being evaluated.

For a particular arc "ab" involved in the evaluation, the difference function $d(f_{j,ab}, p_{j,ab})$ is evaluated for each common OD/QoS combination "j" that is known both to the home router module 130 and the neighboring router module 130 of the particular arc "ab." The resultant expression for the difference function $d(f_{j,ab}, p_{j,ab})$ for arc "ab" and OD/QoS combination "j" is $$d(f_{j,ab}, o_{j,ab}) = (r_{j,ab}/2)*(\hat{g}_{ab} - f_{j,ab})^2 - f_{j,ab}*(p_{j,a} - p_{j,b})$$

where $$\hat{g}_{ab} = ag_{j,ab} - \beta\left(g_{ab} - \sum_{k \ne j} f_{k,ab}\right)$$

The potentials $p_{j,a}$ and $p_{j,b}$ are potentials for router modules 130 "a" and "b" respectively for the "j" OD/QoS combination. Flows $f_{k,ab}$ where k≠j are flows for the arc "ab" associated with OD/QoS combinations other than OD/QoS combination "j".

The first term, $(r_{j,ab}/2)*(\hat{g}_{ab} - f_{j,ab})^2$, of the difference function $d(f_{j,ab}, p_{j,ab})$ is a simplified version of the expression for $E_{\alpha,\beta}(f_{j,ab})$ where only one arc "ab" and one OD/QoS combination "j" is considered. The difference function $d(f_{j,ab}, p_{j,ab})$ is subject to the following boundary conditions:

$$\hat{l}_{j,ab} \leq f_{j,ab} \leq \hat{u}_{j,ab}$$

where $$l_{ab} \leq \sum_j f_{j,ab} \leq u_{ab},$$

$$\hat{l}_{j,ab} = \max\left\{l_{j,ab}, l_{ab} - \sum_{k \neq j} f_{k,ab}\right\},$$

$$\hat{u}_{j,ab} = \min\left\{u_{j,ab}, u_{ab} - \sum_{k \neq j} f_{k,ab}\right\},$$

and where $l_{j,ab}$ and $l_{ab}$ are lower limits, and $u_{j,ab}$ and $u_{ab}$ are upper limits on $f_{j,ab}$ and $f_{ab}$, respectively.

An intuitive explanation of the difference function $d(f_{j,ab}, p_{j,ab})$ is that the first term related to $E_{\alpha,\beta}(f_{j,ab})$ represents undesirable results and conditions of data packet traffic being transmitted over a data communication system, such as delays, poor utilization of resources, poor adaptability to sudden changes, etc. For a given arc, when the goal parameter, $\hat{g}_{ab}$, equals zero and the resistance parameter equals the inverse of capacity of the arc, then the first term of the difference function $d(f_{j,ab}, p_{j,ab})$ equals the number of jobs per unit time that have to go into waiting queue because a router module 130 is busy. The second term $f_{j,ab} * (p_{j,a} - p_{j,b})$ represents effective utilization of the data communication system as subject to constraints imposed by the data communication system such as flow constraints. The difference function $d(f_{j,ab}, p_{j,ab})$ thus represents a difference between desirable and undesirable aspects involved with the data communication system.

Figure 6:
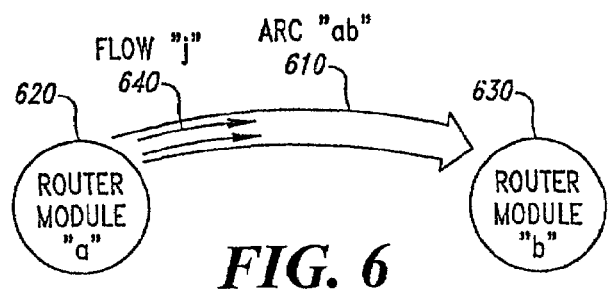
FIG. 6 is a topology diagram showing internal detail of an arc of a router module of FIG. 2.

As part of finding a local equilibrium point, by differentiating the difference function $d(f_{j,ab}, p_{j,ab})$ at each arc between router modules with respect to the flow $f_{j,ab}$ or the OD/QoS combination "j" and arc "ab", setting the resultant differential equal to zero, and solving for the flow, $f_{j,ab}$, a response function results for flow $f_{j,ab}$. As illustrated in FIG. 6, for a particular arc "ab" 610 having beginning router module "a" 620 and ending router module "b" 630 and for a common OD/QoS combination "j", the response function of the optimal flow $f_{j,ab}$ 640 is:

$$f_{j,ab}(p) = \max\{f_{j,ab}, \min\{\hat{u}_{j,ab}, \hat{g}_{ab} - (p_{i,a} - p_{j,b})/r_{j,ab}\}\}$$

where min and max are minimum and maximum functions which choose the minimum or maximum term of the pair of terms that are bracketed. For instance, max (a,b) choose the maximum value between a and b. Thus, max (a, min (bc)) first chooses the minimum choice between b and c. Minimum flow for $f_{j,ab}$ is typically zero. Maximum flow for $f_{j,ab}$ is typically a percentage of arc capacity.

The goal parameter, $r_{j,ab}$, are for the particular arc "ab" and OD/QoS combination "j". The potential $p_{j,a}$ is for the arc beginning router module "a" 620 and the potential $p_{j,b}$ is for the arc ending router module "b" 630. Both potentials $p_{j,a}$ and $p_{j,b}$ are associated with a common OD/QoS combination "j". Typically, the origination and destination nodes for an OD/QoS combination are not the arc beginning and arc ending router modules 620 and 630 respectively. Also, the origination and destination nodes for an OD/QoS combination can be a combination of physical and/or conceptual nodes whereas the arc beginning and arc ending nodes are always physical since they are router modules 130.

Summing these optional flows for arc beginning "a" and arc ending "b" router modules 620 and 630 for arc "ab" over OD/QoS combinations that are known to the arc beginning and ending router modules results in the optimal flow for arc "ab". This response function of flow describes an optimized flow based on certain values for potentials. These potential values further satisfy a constraint based on how data packets are created and terminated in the data communication system.

In the depicted embodiment, the potentials are independent variables and the flows are dependent variables. However, in other embodiments, different subsets of flows and potentials are used so that some flows and potentials are dependent variables and other flows and potentials are independent variables.

The depicted embodiment of the invention is configured so that all data packet traffic originates and terminates at network terminals of network 120 or router modules 130. This means that all data packet traffic having a common destination, either created at a particular router module 130 or arriving at the particular router module, must equal the data packet traffic with the common destination leaving the router module 130. This requirement is referred to as a conservation of flows or a flow constraint. When implementing the method of the depicted embodiment, the router modules 130 scattered throughout a data communication system frequently adjust the data packet routes in the data communication system to pursue the goal of maximizing net benefits for stochastic distributions of network loads and stochastic changes in topology. The adjustments are done by manipulating potential values according to the conservation of flows.

Adjustments are first needed when a data communication system 110 is initially brought into service. Adjustments are subsequently needed due to the continually changing demands or loads by users of the data communication system and changes in the topology of the data communication system due to growth of the data communication system or equipment failures within the existing data communication system. The method of the depicted embodiment incorporated into the dynamic load balancer units 216 of the router modules 130 is responsible for these adjustments made by the router modules.

As stated above, the dynamic load balancer unit 216 uses information collected by the neighborhood supervisor unit 214. This collected information can now be described in terms of the response function for flow $f_{j,ab}$, as discussed above. The discussion will be focused on a particular router module 130 designated the "home" router module, however, the home router module discussed is representative of all router modules in that all router modules also perform the steps described.

In general, there are two main approaches that are used in the present embodiment to determine the flows for a given home router module 130. In both approaches, arcs are distinguished as being either supply arcs or non-supply arcs. A supply arc either directly connects as origination network 120 or origination user device of a network for a given OD/QoS combination to the given home router module 130 or a router module between the network or user device and the home router mode where there is no branching of the arcs for the home router module and the network or user device. Non-supply arcs are also directly connected to the given home router module but are not directly connected to an origination node.

For both approaches, the goal parameters for a supply arc for a given OD/QoS combination are set equal to the user demand or load placed on the supply arc. For instance, if user demand or load was 100 Mbits/sec on a supply arc for a given OD/QoS combination then the goal parameter for the same supply arc for the same OD/QoS combination would be set to 100 Mbits/sec. The neighborhood supervisor unit 214 senses what the demand or load is from any networks 120 on network devices that are directly connected to the home router module 130. Also, for both approaches the resistance parameter for a given OD/QoS combination would be set to a relatively large number for a supply arc. The large number means that there is a high cost incurred if the goal of the goal parameter (in this case 100 Mbits/sec) is not met. For a non-supply arc the resistance parameter for a given OD/QoS combination is set to the inverse of the arc capacity for the given OD/QoS combination.

The two approaches to solve for flows for a given router module differ in how they deal with the goal parameters for non-supply arcs. The first approach solves for flow for one OD/QoS combination at a time whereas the second approach solves for flow for all OD/QoS combinations at once. For the first approach, the goal parameter for a non-supply arc is set to the negative of the historical flow for the OD/QoS combination for the arc. The historical flow for an arc is the most recent flow amount recorded. Often times historical flows tend to change more slowly than demand or load, especially for arcs that have become a major artery for a data communication system. For instance, if the flow on a non-supply arc was most recently recorded as 50 Mbits/sec for an OD/QoS combination, then the goal parameter for that arc would be −50 Mbits/sec.

With the first approach, for a given home router module 130, the dynamic data flow splitter unit 220 determines historical flows from header information on data packets sent from the home router module. These historical flows of the home router module for sent packets are stored in the dynamic data flow splitter unit 220. The historical flows are represented by averages, variances and other expressions known in the art of statistics and mathematics. The neighborhood supervisor unit 214 queries the dynamic data flow splitter unit 22 for the historical flows sent data packets as needed for flow calculations or to send to other neighboring router modules. The historical flows of sent data packets are for arcs directly connected to the given home router module 130 handling packets sent by the home router module to networks or other router modules. In the depicted embodiment, the neighborhood supervisor unit 214 of the given home router module 130 also receives updated historical flow information from other neighborhood supervisors for arcs that are directly connected to the given home router module and carry data packets to the given home router module. A special case of the first approach is where all historical flows are equal to zero. This special case occurs at such times as the initial start-up phase of a data communication system.

The second approach to solve for flows for a given home router module 130 uses computed flows instead of historical flows. Flows are determined for all OD/QoS combinations at once through an iterative process. For a $K^{th}$ iteration, the overall flow for an arc is determined by summing all flows for the OD/QoS combinations for the arc solved during the $K^{th}$ iteration. The goal parameter for the non-supply arcs for the $K+1^{th}$ iteration are then equal to the negative of the overall flows for the arcs for the $K^{th}$ iteration.

The techniques used to solve in this iterative fashion the flows for a home router module 130 for all OD/QoS combinations at once require extensive computing capability. Some embodiments use the second approach to solve for flows for all OD/QoS combinations at once. The depicted embodiment as incorporated into the methods of the described neighborhood supervisor unit 214 uses the first approach to solve for flows one OD/QoS combination at a time for a given home router module starting with Step 710 of FIG. 7.

Figure 7:
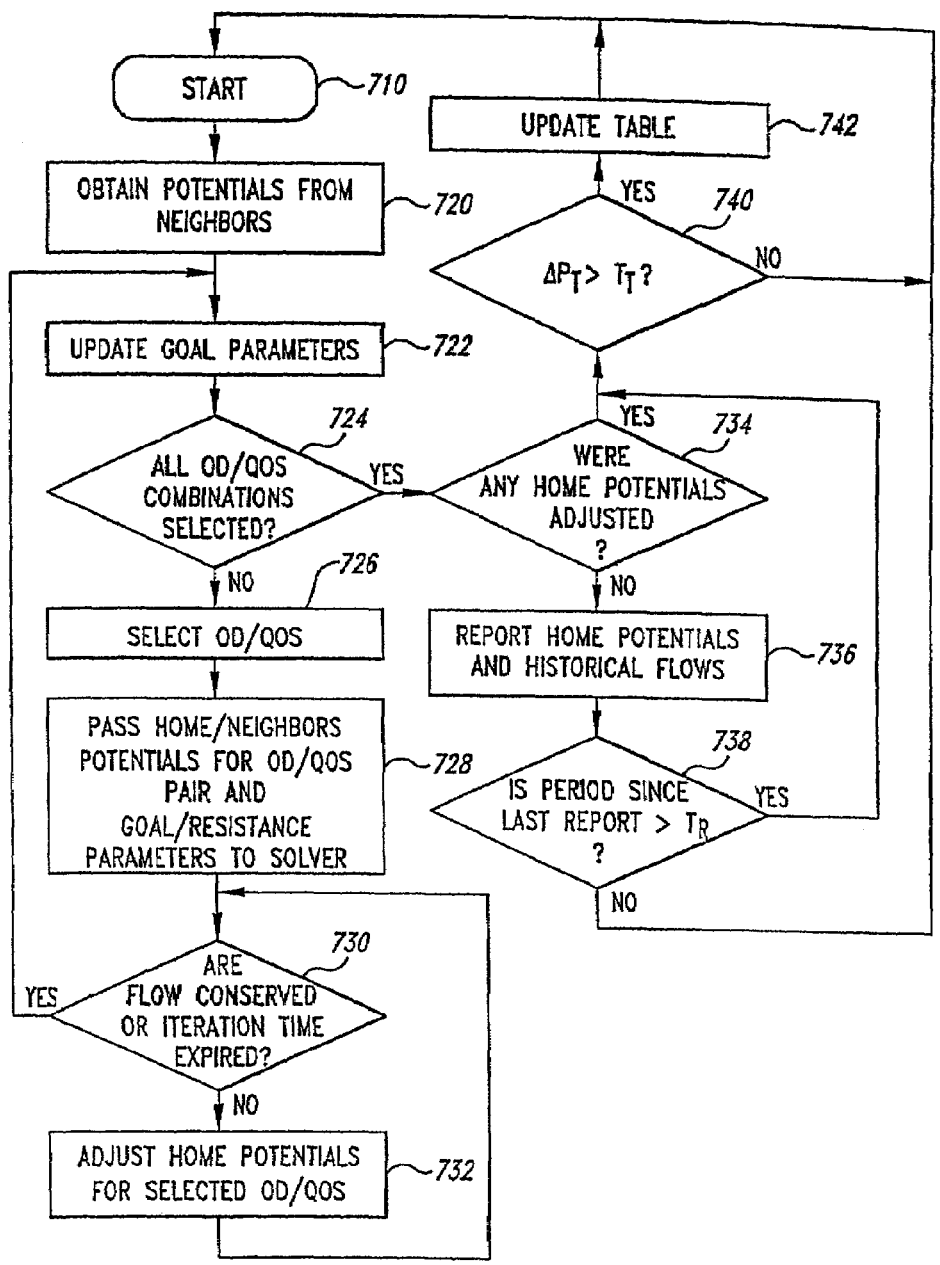
FIG. 7 is a flowchart of a method used by the router modules of FIG. 2.

With the first approach, the neighborhood supervisor unit 214 of the home router module 130 collects potentials and historical flows from all neighboring router modules 130 directly connected to the home router module in step 720 of the flowchart of FIG. 7 showing the method used by the depicted embodiment. The collected potentials and historical flows are for common OD/QoS combinations known to both the home router modules or the home router module initiates transmission and reception of the potentials and historical flows collected from the neighboring router modules to the home router module. In the depicted embodiment, the neighboring router modules initiate the transmission of their potentials and historical flows to the home router module. However, in other embodiments, the home router module initiates the transmission. The dynamic load balancer unit 216 of the home router module 130 then uses the collected potentials and historical flows along with the potentials and historical flows of the home router module to calculate, via the flow response function, the data packet flows for each OD/QoS combination to and from the home router module for all arcs connected to the home router module. For each connection between the home router module 130 and neighboring router modules or networks 120, there are two arcs as described above. One arc has the home router module as the origination node and the other arc as the destination node. In other embodiments, only one-sided connections are possible so that for each connection there is only one arc.

The neighborhood supervisor unit 214 then uses the historical flows and demand or load flows to update the goal parameters for all the non-supply and supply arcs respectively of the home router module 130 in step 722 of FIG. 7. Typically, the goal parameters for non-supply arcs are set to the negative of the historical flow for a given OD/QoS combination and the goal parameters for the supply arcs are set to the demand or load flow on the arc. The neighborhood supervisor unit 214 also identifies any arcs that have zero overall flow based on their historical or demand/load flow so that any subsequent modifications of the home potentials are done with the zero flow conditions in mind as explained further below.

Initially, no OD/QoS combinations are selected by the neighborhood supervisor unit 214, so the outcome of decision 724 of FIG. 7 regarding whether all OD/QoS combinations have been selected is "no." In such case, the neighborhood supervisor unit 214 selects an OD/QoS combination in step 726 that has not been chosen since the last time the start step 710 was performed. For all arcs either originating from or terminating into the home router module, the neighborhood supervisor unit 214 of the home router module passes, in step 728, all the potentials of the home router module and those collected from neighboring router modules for the selected OD/QoS combination to the dynamic load balancer unit 216. The neighborhood supervisor unit 214 also passes all the goal parameters and resistance parameters for the arcs of the particular router module 130 based on the most recent historical and demand/load flows collected by the neighborhood supervisor unit 214 to the dynamic load balancer unit 216.

The dynamic load balancer unit 216 then determines, for the selected OD/QoS combination, the flow across the arcs of the home router module. The dynamic load balancer unit 216 then determines, in decision step 730 or FIG. 7 whether the determined flows are conserved for the selected OD/QoS combination or whether the time period for iteration has expired. Flows are conserved when the incoming flows plus flows originated by the home router module equals the flows leaving the home router module. If flows are not conserved for the selected OD/QoS combination or the time for iteration has not expired, the decision step in 730 is "no" and the method branches to step 732 where the dynamic load balancer unit 216 adjusts the potentials for the home router module 130 for the selected OD/QoS combination. After the home potentials are adjusted in step 732, flow conservation is again checked in decision step 730. The home potentials are iteratively adjusted through the combination of potential adjustment in step 732 and flow conservation verification in decision 730 until flow is conserved and decision step 730 is "yes" and the method branches back to step 722 to update the goal parameters. Iteration techniques to allow for rapid convergence to solutions involving iteration are known in the art and include over or under-relaxation techniques. In one embodiment, the potentials are adjusted one at a time by the iteration process for a given OD/QoS combination until flow is conserved. In another embodiment all the potentials for a router module for all the OD/QoS combinations associated with the router module are adjusted for each iteration of a Gaussian or other second method of determining solutions by block techniques known in the art.

If the neighborhood supervisor unit 214 has identified any zero flow arcs that have zero overall flow when the goal parameters are initially updated in step 722 immediately after the historical and demand flows are obtained in step 720, then during the home potential adjustment in step 732, a goal parameter associated with a zero flow arc can be set to the negative of any calculated flow for the zero flow arc resulting from adjustments of potentials for an OD/QoS combination to ensure that the flow for the zero flow arc remains small. The new value for the goal parameter for the zero flow arc is then used to update the goal parameters in step 722. At the completion of adjusting potentials for all OD/QoS combinations, the updated goal parameter for a zero flow arc will then be the summation of flow over all OD/QoS combinations for the particular zero flow arc due to adjustment of potentials.

Once any goal parameters are updated in step 722 another OD/QoS combination is selected which has not been previously selected since the last performance of start step 710 and steps 728–732 are again performed for the newly selected OD/QoS combination. After steps 728–732 are completed, again any changed goal parameters are updated. The process similarly cycles through the OD/QoS combinations until decision step 724 determines that all OD/QoS combination have been selected, whereby the "yes" branch is taken and decision step 734 determines if any potential of the home router module 130 has been adjusted by step 732.

If any home potentials were adjusted, then decision step 734 branches to step 736 of FIG. 7 where the neighborhood supervisor unit 214 of the home router module 130 reports the adjusted home potentials and historical flows to the neighboring router modules. Decision step 738 then determines if the period of time since the neighborhood supervisor unit 214 of the home router module 130 last reported home potentials to neighboring router modules is greater than a predetermined amount of time, $T_R$. If the period is not greater than $T_R$, decision step 738 branches back to the start step 738 branches back to the start step 710. If the period is greater than $T_R$, decision step 738 branches to decision step 740, the same step to which decision step 734 branches if no home potentials were adjusted. In decision step 740 a determination is made as to whether any adjusted home potentials have changed more than a predetermined threshold $T_T$ since the last time electronic tables of the dynamic load balancer unit 216 storing the home potentials have been updated with adjusted home potentials. If any changes in the adjusted home potentials are greater than $T_T$, decision step 740 branches to step 742 wherein the electronic tables are updated with the latest values for the home potentials. The dynamic load balancer unit 216 subsequently updates the routing table unit 218. If there are no changes in the adjusted home potentials greater than $T_T$, decision step 740 branches to the start step 710.

The present invention is not limited to the particular routines used by the depicted embodiment to report updated potentials to neighboring router modules 130 or in updating electronic tables storing home potentials. Other embodiments use other methods, intervals, or thresholds to determine when to report to neighboring router modules 130 and when to update electronic tables storing home potentials.

In an alternative embodiment, the resistance parameter for each particular arc is a function of the flows of each OD/QoS combination. For instance, for a particular OD/QoS combination, the resistance, r, is as follows:

$$r = \frac{d^2}{df^2}(f/(c-f))$$

where f is the flow for an arc for an OD/QoS combination and c is the capacity or residual capacity of the arc. It follows that since the response function expresses the dependency of flow for an OD/QoS combination for an arc, the resistance parameters are also expressible in terms of potentials.

In many instances, the topology of a data communication system is not known and cannot be computed fast enough. In such systems, sometimes referred to as "spontaneous networks," connections often are formed haphazardly and opportunistically, and the topology often changes suddenly, seemingly at random. Spontaneous networks differ from typical networks in that the haphazard nature of the spontaneous network makes common routing techniques ineffective.

Figure 8:
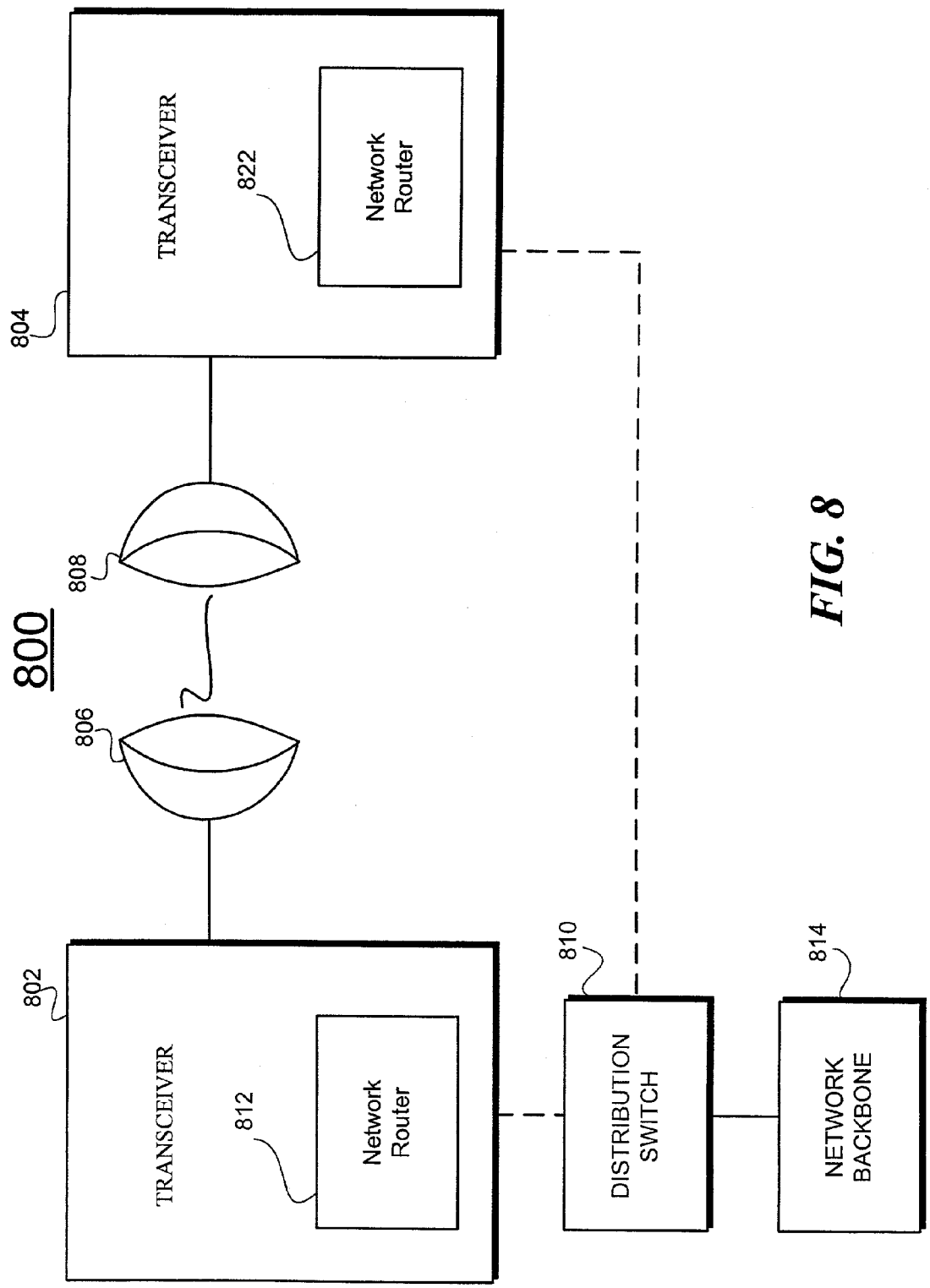
FIG. 8 is a high-level block diagram of an example spontaneous network according to embodiments of the present invention

FIG. 8 is a high-level block diagram of an example spontaneous network 800 according to embodiments of the present invention. The example network 800 may be an optical system that uses the atmosphere as the transmission medium and in which data packets are transmitted and received via an optical carrier. In other embodiments, the example spontaneous network 800 is any wireless communication system where the atmosphere is the transmission medium and data is transmitted and received across an analog link via a radio frequency (RF) carrier, a microwave carrier, an infrared (IR), and/or the like.

The example network 800 as illustrated in FIG. 8 includes a transceiver 802 and a transceiver 804, which when operating transmit and receive data packets through free space via an antenna 806 and an antenna 808, respectively. In one embodiment, the transceivers 802 and 804 transmit and receive data packets via the antennas 806 and 808, respectively, on an optical carrier. In alternative embodiments, the transceivers 802 and 804 transmit and receive data packets via the antennas 806 and 808, respectively, on an RF carrier, a microwave carrier, or other suitable analog carrier. Only two sets of antennas and transceivers are depicted in FIG. 8 for simplicity, as well as only one distribution switch. However, it is common for data communication networks such as the example network 800 to have several hundred or several thousand distribution switches and sets of transceivers and antennas. The combination of an antenna and a transceiver is sometimes referred to herein as an antenna/transceiver set.

In one embodiment, the transceivers 802 and 804 may be optical transceivers, which when operating transmit and receive a light beam via free space. Alternatively, the transceivers 802 and 804 may be RF transceivers, microwave transceivers, or other suitable transceivers. The antennas 806 and 808 can be telescopes, RF antennas, microwave antennas, or suitable antennas.

The example transceivers 802 and 804 in one embodiment of the present invention include network routers 812 and 822, respectively. The network routers 812 and 822 direct data packets from source to destination, typically by passing messages and analyzing a routing table to determine the best path for packets to take. The network router 812 also may configure the best route for the packets to reach their ultimate destination. The network routers 812 and 822 may implement a variety of routing protocols to direct data packets, such as well-known Open Shortest Path First (OSPF), Border Gateway Protocol (BGP), Routing Information Protocol (RIP), or Transport Control Protocol/Internet Protocol (TCP/IP). Alternatively, the network routers 812 and 822 may include router modules 130 as described above to direct data packets. Routers suitable for implementing the network router 812 are well known.

The example transceivers 802 and 804 may be coupled to a distribution switch 810, which when operating filters and forwards data packets. In one embodiment, the distribution switch 810 allows multiple Ethernet connections. Distribution switches suitable for implementing the distribution switch 810 are well known. The distribution switch 810 is coupled to a network backbone 814, which generally is a connection of multipoint hubs (MPH), customer premised equipment (CPE), and/or points of presence (POP). The multipoint hubs may be connected to each other via reflective photon collectors (RPC). In an alternative embodiment, the backbone 814 is any suitable data packet path that connects local area networks (LAN), wide area networks (WAN), or other subnetworks to each other. Backbones suitable for implementing the network backbone 814 are well known.

In one embodiment, the transceivers are located in or on mobile units such as vehicles and stationary units to form a mobile spontaneous network. Vehicles may include buses, automobiles, bicycles, motorcycles, trains, trolleys, ferries, trucks, and/or other suitable mobile unit. Stationary units may be located on road signs, bridges, overpasses, trestles, stoplights, architectural structures (e.g., buildings, trusses), or other suitable location.

Figure 9:
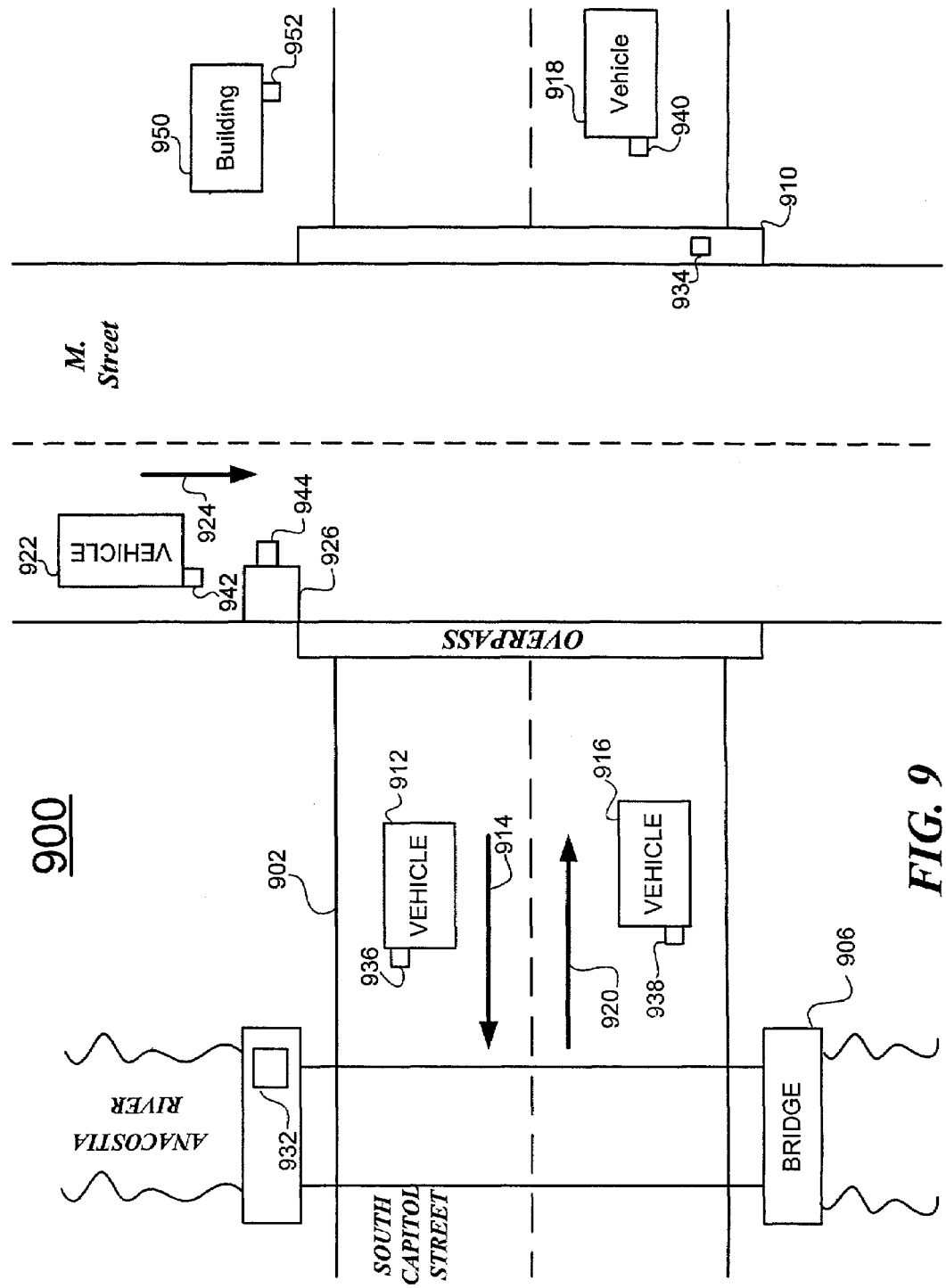
FIG. 9 is a high-level block diagram of an example spontaneous network according to embodiments of the present invention

FIG. 9 is a high-level block diagram of an example outdoor, mobile, spontaneous network 900 according to an embodiment of the present invention. The example network 900 may include South Capitol Street 902, the Anacostia River 904, the South Capitol Street Bridge 906, "M" Street 908, and an "M" Street Overpass 910. A vehicle 912 travels in a direction 914 along South Capitol Street 902, and vehicles 916 and 918 travel in a direction 920 along South Capitol Street 902. A vehicle 922 travels in a direction 924 along "M" Street 908. "M" Street 908 has a road sign 926 and there is a building 950 on "M" Street 908.

Antenna/transceiver sets 932 and 934 are located on the South Capitol Street Bridge 906 and the "M" Street Overpass 910, respectively. Antenna/transceiver sets 936 and 942 are located in vehicles 912 and 922, respectively, and their associated antennas are placed inconspicuously in headlights of the vehicles 912 and 922, respectively. Antenna and transceiver 938 and 940 are located in vehicles 916 and 918, respectively, and their associated antennas are placed inconspicuously in taillights. Of course, antennas may be utilized in other locations on the vehicle (e.g., headlights, taillights, radio antennas brake lights, and other suitable vehicle light fixtures). In this manner, the common form and function of the vehicle remains the same, but with an added functionality of transmitting and receiving data packets. Antenna/transceiver set 944 is located on the road sign 926 and Antenna/transceiver set 952 is located at building 950 (e.g., on the roof, in a window, etc.). Of course, there are commonly several hundred thousand vehicles with suitable headlights and taillights that travel along highways and other roadways daily or even hourly. However, for ease of explanation only a few vehicles, roadways, and road signs are shown and described herein.

According to an embodiment of the present invention, as the vehicles travel within the example network 900 and the topology of the example network 900 changes rapidly, randomly (or stochastically), and spontaneously, the network routers in the antenna/transceiver sets determine how to direct data packets without having to have a global view of the example network 900. Because vehicles may be traveling as they commonly travel, the network routers in the antenna/transceiver sets make routing decisions within the allotted time frame(s).

For example, when the topology is as depicted in FIG. 9 the network router associated with the antenna/transceiver set 936 may direct data packets to the network router associated with the antenna/transceiver sets 932 and/or 938. Similarly, the router associated with the antenna/transceiver set 940 may direct data packets to the network router associated with the antenna/transceiver sets 952 and/or 934. As vehicles travel in the direction 914 along South Capitol Street 902, network routers may direct data packets to the network router associated with the antenna/transceiver sets 952, 944, 934, and/or 932. As vehicles travel in the direction 920, routers may direct data packets to the network router associated with the antenna/transceiver sets 932, 944, 934, and/or 952. As vehicles pass each other, network routers may direct data packets vehicle-to-vehicle (e.g., the vehicle 982 transmits and receives data packets from the vehicle 916).

Figure 10:
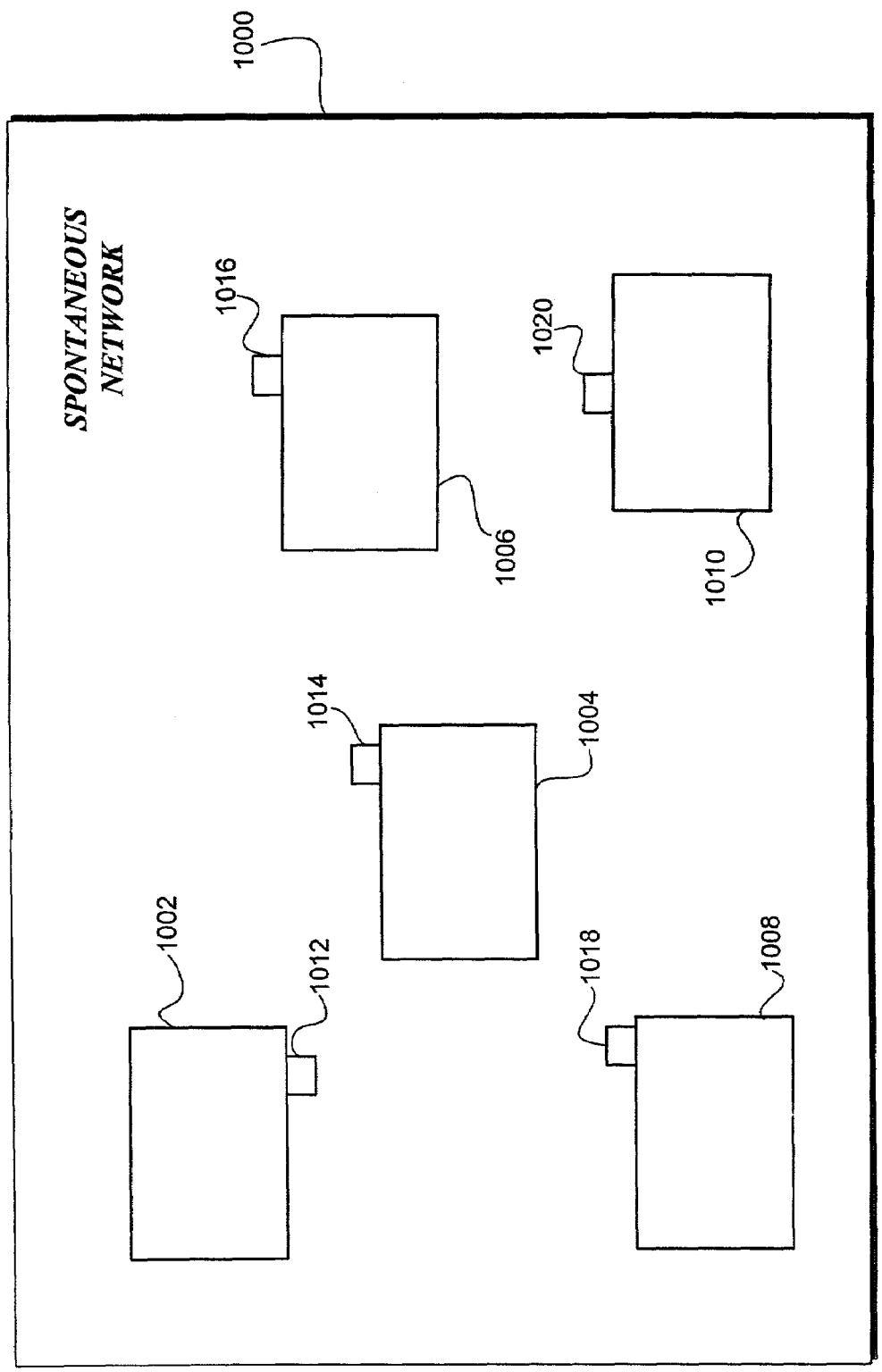
FIG. 10 is a high-level block diagram of an example spontaneous network according to embodiments of the present invention.

In one embodiment, the transceivers are located in communication units placed out of the way on the floor of a facility (e.g., a factory, an office, and the like) to form an indoor, stationary, spontaneous network. The haphazard nature of the spontaneous network results from frequent occlusions of the wireless links between antenna/transceiver sets caused by people and objects moving about on the facility floor. FIG. 10 is a high-level block diagram of an example indoor, stationary, spontaneous network 1000 according to an embodiment of the present invention.

The example network 1000 includes several stationary units 1002, 1004, 1006, 1008, and 1010. In one embodiment, the stationary units may be office equipment and/or furniture such as desks, credenzas, cabinets, telephones, chairs, printers, copiers, lamps, light fixtures, thermostats, computers, and other suitable office equipment and/or furniture. In another embodiment, the stationary units may be manufacturing equipment and/or furniture such as milling machines, lathes, drill presses, tools, toolboxes, parts washers, forklifts, computers, chairs, work benches, lights fixtures, and other suitable manufacturing equipment and/or furniture. Although called "stationary units," the stationary units 1002, 1004, 1006, 1008, and 1010 are intended to represent units that tend to remain stationary, but which may or may not be permanent in their particular location. For example, a stationary unit may be a laptop computer, which tends to remain stationary, but is typically is not permanent at its particular location.

According to an embodiment of the present invention, each stationary unit includes an antenna/transceiver set, such as antenna/transceiver sets 1012, 1014, 1016, 1018, and 1020, respectively.

As the people and stationary units move within the example network 1000 and the topology of the example network 1000 changes rapidly, randomly (or stochastically), and spontaneously, the network routers in the antenna/transceiver sets determine how to direct data packets without having to have a global view of the example network 1000. The network router associated with the antenna/transceiver set 1012 may direct data packets to the network router associated with the antenna/transceiver sets 1014, 1016, and/or 1018, depending on which link is available (e.g., not occluded). Similarly, the network router associated with the antenna/transceiver set 1014 may direct data packets to the network router associated with the antenna/transceiver sets 1012, 1016, 1018, and/or 1020. Other network routers associated with the antenna/transceiver sets may direct data packets to each other in a like manner.

FIG. 11 is a high-level block diagram of an example spontaneous network 1100 according to an embodiment of the present invention. The example network 1100 may include a street 1102 and a street 1104. Vehicles 1112, 1114, 1116, and 1118 travel in a direction 1113 along the street 1102. An antenna/transceiver set 1120 is located on an overpass on the street 1104. In this embodiment, the vehicles 1112, 1114, 1116, and 1118 may be store and forward network elements. The antenna/transceiver set 1120 may behave as a drain for traffic from mobile units such as the vehicles 1112, 1114, 1116, and 1118 to be offloaded. There are antenna/transceiver sets similar to those described above (not shown) located in the vehicles 1112, 1114, 1116, and 1118, and their associated antennas are placed inconspicuously, in their headlights, taillights, radio antennas, brake lights, and other suitable vehicle light fixtures.

According to the embodiment depicted in FIG. 11, each vehicle 1112, 1114, 1116, and 1118 is participating in communications within the network 1100. For example, the vehicle 1112 communicates with the antenna/transceiver set 1120, as depicted by the arrow 1140, and with the vehicle 1114, as depicted by the arrow 1142. The vehicle 1116 communicates with the vehicle 1114, as depicted by the arrow 1144, and with the vehicle 1118, as depicted by the arrow 1146.

FIG. 12 is a high-level block diagram of an example spontaneous network 1200 according to an embodiment of the present invention. The example network 1200 may include a street 1202 and a street 1204. Vehicles 1212, 1214, 1216, and 1218 travel in a direction 1213 along the street 1202. An antenna/transceiver set 1220 is located on an overpass on the street 1204. The antenna/transceiver set 1220 may behave as a drain for traffic from mobile units such as the vehicles 1212, 1216, and 1218 to be offloaded. There are antenna/transceiver sets similar to those described above (not shown) located in the vehicles 1212, 1216, and 1218, and their associated antennas are placed inconspicuously, in their headlights, taillights, radio antennas, brake lights, and other suitable vehicle light fixtures.

According to the embodiment depicted in FIG. 12, only the vehicles 1212, 1216, and 1218 are participating in communications within the network 1200. The vehicle 1214 does not participate in communications within the network 1200. For example, the vehicle 1212 communicates with the antenna/transceiver set 1220, as depicted by the arrow 1240. The vehicle 1216 communicates with the vehicle 1218, as depicted by the arrow 1246. The vehicles 1216 and 1218 cannot communicate with the antenna/receiver set 1220 until they come within the range of the antenna/receiver set 1220. In this embodiment, because at least one vehicle (e.g., the vehicle 1214) is not participating any of the vehicles 1212, 1216, and 1218 may be store then forward when possible network elements rather than store and forward network elements.

FIG. 13 is a high-level block diagram of an example spontaneous network 1300 according to an embodiment of the present invention. The example network 1300 may include a street 1302 and a street 1304. Vehicles 1312, 1314, 1316, 1318, and 1322 travel in a direction 1312 along the street 1302. An antenna/transceiver set 1320 is located on an overpass on the street 1304. The antenna/transceiver set 1320 may behave as a drain for traffic from mobile units such as the vehicles 1312, 1316, 1318, and 1322 to be offloaded. There are antenna/transceiver sets similar to those described above (not shown) located in the vehicles 1312, 1316, 1318, and 1322, and their associated antennas are placed inconspicuously, in their headlights, taillights, radio antennas, brake lights, and other suitable vehicle light fixtures.

According to the embodiment depicted in FIG. 13, only the vehicles 1312, 1316, 1318, and 1322 are participating in communications within the network 1300. The vehicle 1314 does not participate in communications within the network 1300. For example, the vehicle 1312 communicates with the antenna/transceiver set 1320, as depicted by the arrow 1340, and with the vehicle 1322, as depicted by the arrow 1342. The vehicle 1316 communicates with the vehicle 1322, as depicted by the arrow 1344 and communicates with the vehicle 1318, as depicted by the arrow 1346. The vehicles 1316 and 1318 can offload their traffic to the vehicle 1322 rather than wait until they come within the range of the antenna/receiver set 1320.

Aspects of the invention can be implemented using hardware, software, or a combination of hardware and software. Such implementations include state machines, a field programmable gate array (FPGA), a microprocessor, an application specific integrated circuit (ASIC), discrete medium scale integrated (MSI) circuits, analog circuitry, etc. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system, comprising:
a spontaneous data communication network having:
   a set of mobile units, wherein each mobile unit in the set of mobile units includes a router to transmit and receive data packets from any other mobile unit in the set of mobile units, wherein at least one mobile unit includes an antenna in a light, wherein each router is a home router to store and adjust home potentials of the home router, to receive and store neighbor potentials of neighboring routers, to determine ideal data packet flows using the home and neighbor potentials with an optimization of at least one of a merit function or a penalty function involving stochastic changes in topology in the spontaneous data communication network, and to receive and route data packets based on the home and neighbor potentials.

2. The system of claim 1, wherein each router implements at least one of an Open Shortest Path First (OSPF), Border Gateway Protocol (BGP), Routing Information Protocol (RIP), or Transport Control Protocol/Internet Protocol (TCP/IP).

3. The system of claim 1, further comprising a set of stationary units, wherein each stationary unit in the set of stationary units includes a router to transmit and receive data packets from any other stationary unit in the set of stationary units or any other mobile unit.

4. The system of claim 3, wherein each antenna transmits and receives data on at least one of an optical carrier, a radio frequency (RF) carrier, a microwave carrier, or an infrared (IR) carrier via free space.

5. The system of claim 4, wherein each router implements at least one of an Open Shortest Path First (OSPF), Border Gateway Protocol (BGP), Routing Information Protocol (RIP), or Transport Control Protocol/Internet Protocol (TCP/IP).

6. A system, comprising:
a spontaneous data communication network having:
   a set of stationary units, wherein each stationary unit in the set of stationary units includes a router to transmit and receive data packets from any other stationary unit in the set of stationary units, wherein each router is a home router to store and adjust home potentials of the home router, to receive and store neighbor potentials of neighboring routers, to determine ideal data packet flows using the home and neighbor potentials with an optimization of at least one of a merit function or a penalty function involving stochastic changes in topology in the spontaneous data communication network, and to receive and route data packets based on the home and neighbor potentials.

7. The system of claim 6, wherein each router implements at least one of an Open Shortest Path First (OSPF), Border Gateway Protocol (BGP), Routing Information Protocol (RIP), or Transport Control Protocol/Internet Protocol (TCP/IP).

8. The system of claim 6, wherein at least one stationary unit in the set of stationary units includes furniture.

9. The system of claim 6, wherein at least one stationary unit in the set of stationary units includes equipment.

10. An apparatus, comprising:
a vehicle having:
   an antenna located in a headlight or a taillight; and
   a transceiver coupled to the antenna, the transceiver having a router to transmit and receive data packets, wherein each router is a home router to store and adjust home potentials of the home router, to receive and store neighbor potentials of neighboring routers, to determine ideal data packet flows using the home and neighbor potentials with an optimization of at least one of a merit function or a penalty function involving stochastic changes in topology in the spontaneous data communication network, and to receive and route data packets based on the home and neighbor potentials.

11. The system of claim 10, wherein each router implements at least one of an Open Shortest Path First (OSPF), Border Gateway Protocol (BGP), Routing Information Protocol (RIP), or Transport Control Protocol/Internet Protocol (TCP/IP).

12. An apparatus, comprising:
a stationary unit having:
   an antenna; and
   a transceiver coupled to the antenna having a router to store and adjust its potentials, to receive and store a secondary set of potentials of routers in a secondary set of routers, to determine ideal data packet flows using the potentials with an optimization of at least one of a merit function or a penalty function involving stochastic changes in topology in a spontaneous data communication network, and to receive and route data packets based on the potentials.

13. The apparatus of claim 12, wherein the stationary unit is at least one of a piece of furniture or equipment.

14. The apparatus of claim 13, wherein the stationary unit is at least one of a road sign, an overpass, a bridge, a stoplight, a computer, a desk, a credenza, a cabinet, a telephone, a chair, a printer, a copier, a lamp, a light fixture, a thermostat, a computer, an architectural structure, a milling machine, a lathe, a drill press, a tool, a toolbox, a parts washer, a forklift, or a workbench.

15. The apparatus of claim 12, wherein each antenna transmits and receives data on at least one of an optical carrier, a radio frequency (RF) carrier, a microwave carrier, or an infrared (IR) carrier via free space.

16. A method, comprising:
transmitting data packets into free space from an antenna in at least one of a first vehicle headlight or taillight;
routing the data packets to at least one of a second vehicle headlight or taillight, a road sign, an overpass, a bridge, a stoplight, or a building; and
receiving the data packets from free space at an antenna in at least one of the second vehicle headlight or taillight, the road sign, an overpass, a bridge, a stoplight, or a building, wherein routing the data packets to at least one of a second vehicle headlight or taillight, a road sign an overpass a bridge, a stoplight, or a building comprises at least one of receiving, storing, or adjusting potentials to determine ideal data packet flows with an optimization of a merit function or a penalty function involving stochastic changes in topology in a spontaneous data communication network, and routing data packets based on the potentials.

17. The method of claim 16, wherein transmitting data packets into free space from an antenna in at least one of a first vehicle headlight or taillight and receiving the data packets from free space at an antenna in at least one of the second vehicle headlight or taillight, the road sign, an overpass, a bridge, a stoplight, or a building comprises transmitting and receiving data packets on at least one of an optical carrier, a radio frequency (RF) carrier, a microwave carrier, or an infrared (IR) carrier via free space.

18. The method of claim 16, wherein routing the data packets to at least one of a second vehicle headlight or taillight, a road sign, an overpass, a bridge, a stoplight, or a building comprises implementing at least one of an Open Shortest Path First (OSPF), Border Gateway Protocol (BGP), Routing Information Protocol (RIP), or Transport Control Protocol/Internet Protocol (TCP/IP).

19. A system, comprising:
   a spontaneous data communication network having:
      a set of mobile units, wherein each mobile unit in the set of mobile units includes a router to transmit and receive data packets from any other mobile unit in the set of mobile units, wherein each router is a home router to store and adjust home potentials of the home router, to receive and store neighbor potentials of neighboring routers, to determine ideal data packet flows using the home and neighbor potentials with an optimization of at least one of a merit function or a penalty function involving stochastic changes in topology in the spontaneous data communication network, and to receive and route data packets based on the home and neighbor potentials.

20. The system of claim 19, wherein at least one mobile unit in the set of mobile units includes a bus, an automobile, a bicycle, a motorcycle, a train, a trolley, a ferry, or a truck.

* * * * *